US009945440B2

(12) United States Patent
Muller et al.

(10) Patent No.: US 9,945,440 B2
(45) Date of Patent: Apr. 17, 2018

(54) DEVICE FOR DAMPING THE MOVEMENT OF A MOVABLY MOUNTED COMPONENT

(71) Applicant: FULTERER Gesellschaft mbH, Lustenau (AT)

(72) Inventors: Wolfgang Muller, Lustenau (AT); Edwin Grubel, Widnau (CH)

(73) Assignee: FULTERER Gesellschaft mbH, Lustenau (AT)

( * ) Notice: Subject to any disclaimer, the term of this patent is extended or adjusted under 35 U.S.C. 154(b) by 459 days.

(21) Appl. No.: 14/374,087

(22) PCT Filed: Dec. 13, 2012

(86) PCT No.: PCT/AT2012/000316
§ 371 (c)(1),
(2) Date: Jul. 23, 2014

(87) PCT Pub. No.: WO2013/110101
PCT Pub. Date: Aug. 1, 2013

(65) Prior Publication Data
US 2014/0339031 A1    Nov. 20, 2014

(30) Foreign Application Priority Data

Jan. 25, 2012  (AT) .................................. A 84/2012

(51) Int. Cl.
*F16F 9/12* (2006.01)
*F16F 7/06* (2006.01)
*F16F 9/512* (2006.01)

(52) U.S. Cl.
CPC .................. *F16F 9/12* (2013.01); *F16F 7/06* (2013.01); *F16F 9/512* (2013.01); *A47B 2210/0094* (2013.01)

(58) Field of Classification Search
CPC ..... F16F 9/12; F16F 9/512; F16F 7/06; A47B 2210/0094
See application file for complete search history.

(56) References Cited

U.S. PATENT DOCUMENTS 2,653,043 A    9/1953  Carlson
4,426,752 A    1/1984  Nakayama
(Continued)

FOREIGN PATENT DOCUMENTS

AT         503877       1/2008
CA        2013633      10/1990
(Continued)

*Primary Examiner* — Bradley T King
(74) *Attorney, Agent, or Firm* — Volpe and Koenig, P.C.

(57) ABSTRACT

A device for damping the movement of a movably mounted component includes a first, mechanically acting braking device with at least one friction pair, wherein, in order to generate a braking force, a driven friction surface can be rotated about an axis of the first braking device relative to a secured friction surface resting thereon, and a second braking device which is coupled to the first braking device, wherein the friction surfaces of the friction pair, or of at least one of the friction pairs, are pressed against each other in response to a braking force exerted by the second braking device. The second braking device has at least one driven damper surface that can be rotated about an axis of the second braking device and cooperates with at least one secured damper surface to enclose at least one gap in which a viscous damping medium is present that causes a braking force of the second braking device when the at least one driven damper surface is rotated with respect to the at least one secured damper surface.

11 Claims, 16 Drawing Sheets

(56) References Cited

U.S. PATENT DOCUMENTS

| | | |
|---|---|---|
| 4,603,239 A | 7/1986 | Ishii |
| 4,697,673 A | 10/1987 | Omata |
| 4,732,434 A | 3/1988 | Hartrum |
| 4,772,078 A | 9/1988 | Bowyer |
| 4,830,151 A * | 5/1989 | Numata ............... F16D 41/206 16/82 |
| 5,040,858 A | 8/1991 | Kruse et al. |
| 5,050,942 A | 9/1991 | Frederick et al. |
| 5,143,432 A | 9/1992 | Ohshima et al. |
| 5,240,318 A | 8/1993 | Schroder et al. |
| 5,277,282 A | 1/1994 | Umemura |
| 5,303,994 A | 4/1994 | Elsholz |
| 5,335,563 A * | 8/1994 | Yamamoto ............ B60T 7/045 188/290 |
| 5,335,986 A | 8/1994 | Hartrum et al. |
| 5,460,252 A * | 10/1995 | Kosugi .................. E05F 3/14 16/85 |
| 5,887,930 A * | 3/1999 | Klein .................... B62D 25/12 296/37.12 |
| 6,095,262 A | 8/2000 | Chen |
| 6,095,626 A | 8/2000 | Lautenschläger |
| 6,312,186 B1 | 11/2001 | Rock et al. |
| 6,866,588 B2 * | 3/2005 | Doornbos ............... E05F 5/10 192/12 BA |
| 7,032,985 B1 | 4/2006 | Ichioka et al. |
| 7,101,001 B1 | 9/2006 | Chiu |
| 7,320,507 B2 | 1/2008 | White et al. |
| 7,815,267 B1 | 10/2010 | Frousiakis |
| 2002/0078529 A1 | 6/2002 | Schwarz |
| 2002/0101014 A1 | 8/2002 | Kurihara et al. |
| 2002/0157495 A1 | 10/2002 | Goto et al. |
| 2003/0076016 A1 | 4/2003 | Westwinkel |
| 2004/0100165 A1 | 5/2004 | Hoffman |
| 2004/0130246 A1 | 7/2004 | Dube et al. |
| 2005/0040659 A1 | 2/2005 | Baker et al. |
| 2006/0061245 A1 | 3/2006 | Huber et al. |
| 2006/0066187 A1 | 3/2006 | Chang |
| 2006/0113154 A1 | 6/2006 | Hayashi et al. |
| 2006/0125357 A1 | 6/2006 | Ludwig et al. |
| 2006/0267461 A1 | 11/2006 | Hoffman |
| 2007/0018542 A1 | 1/2007 | Liao |
| 2007/0145867 A1 | 6/2007 | Gasser |
| 2007/0182292 A1 | 8/2007 | Huang |
| 2008/0061663 A1 | 3/2008 | Wu |
| 2008/0290774 A1 | 11/2008 | Gasser et al. |
| 2009/0079312 A1 | 3/2009 | Laible |
| 2010/0027923 A1 | 2/2010 | Bonat |
| 2010/0194256 A1 | 8/2010 | Grabherr |
| 2010/0264794 A1 | 10/2010 | Hu et al. |
| 2011/0001410 A1 | 1/2011 | Chen et al. |
| 2011/0001412 A1 | 1/2011 | Zimmerman |
| 2011/0043087 A1 | 2/2011 | Shih et al. |
| 2011/0067964 A1 | 3/2011 | Krammer et al. |
| 2011/0101839 A1 | 5/2011 | Boks |
| 2011/0176755 A1 | 6/2011 | Chen et al. |
| 2011/0175508 A1 | 7/2011 | Rechberg |
| 2012/0068590 A1 | 3/2012 | Chen et al. |
| 2012/0144622 A1 | 6/2012 | Juan et al. |
| 2013/0133157 A1 | 5/2013 | Kimura |
| 2013/0153347 A1 | 6/2013 | Oda et al. |
| 2015/0091427 A1 | 4/2015 | Haemmerle et al. |

FOREIGN PATENT DOCUMENTS

| | | |
|---|---|---|
| CA | 2048153 | 2/1992 |
| CN | 1367326 | 9/2002 |
| DE | 601293 | 7/1934 |
| DE | 654017 | 11/1937 |
| DE | 2911772 A1 | 10/1979 |
| DE | 3431386 A1 | 3/1986 |
| DE | 9012423 U1 | 10/1990 |
| DE | 9311534 U1 | 12/1993 |
| DE | 4325920 C2 | 2/1995 |
| DE | 4427026 A1 | 8/1995 |
| DE | 19615433 | 10/1996 |
| DE | 29620152 | 5/1997 |
| DE | 19634581 A1 | 1/1998 |
| DE | 19717937 | 5/1998 |
| DE | 19938626 | 7/2001 |
| DE | 10214596 | 1/2003 |
| DE | 20116197 | 3/2003 |
| DE | 10213726 | 10/2003 |
| DE | 10210917 | 11/2003 |
| DE | 10313659 | 9/2004 |
| DE | 20308218 U1 | 9/2004 |
| DE | 202005020820 | 9/2006 |
| DE | 102006022563 | 11/2007 |
| DE | 102006051688 | 5/2008 |
| DE | 20 2009 002 035 U1 | 8/2010 |
| DE | 102009012921 A1 | 9/2010 |
| DE | 102009012922 A1 | 9/2010 |
| DE | 102011051907 A1 | 1/2013 |
| EP | 0593810 | 9/1994 |
| EP | 0951848 A1 | 10/1999 |
| EP | 1260159 | 11/2002 |
| EP | 1336357 A1 | 8/2003 |
| EP | 1336709 | 8/2003 |
| EP | 1384420 A1 | 1/2004 |
| EP | 1500763 | 1/2005 |
| EP | 1532892 A1 | 5/2005 |
| EP | 1561398 A1 | 8/2005 |
| EP | 2620079 | 7/2013 |
| GB | 1117071 | 6/1968 |
| GB | 2302906 A1 | 2/1997 |
| GB | 2376043 | 12/2002 |
| JP | 59222631 | 12/1984 |
| JP | 01266331 | 10/1989 |
| JP | 4321825 | 11/1992 |
| WO | 2008107499 | 9/2008 |
| WO | 2011069175 A1 | 6/2011 |
| WO | 2013110100 A1 | 8/2013 |
| WO | 20130110099 A1 | 8/2013 |
| WO | 2013110102 A1 | 9/2013 |
| WO | 2013138826 A1 | 9/2013 |

* cited by examiner

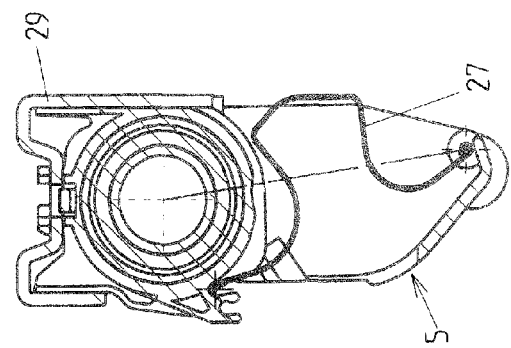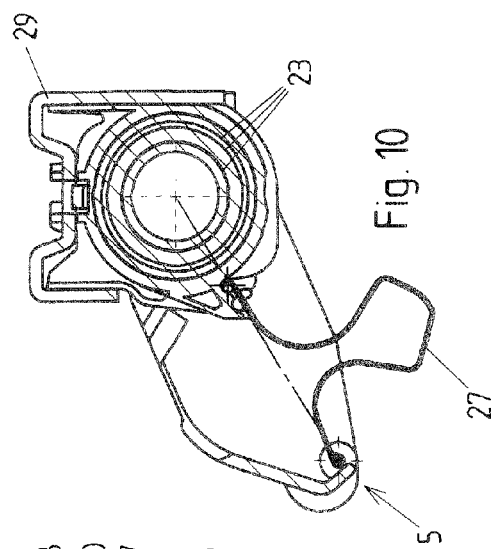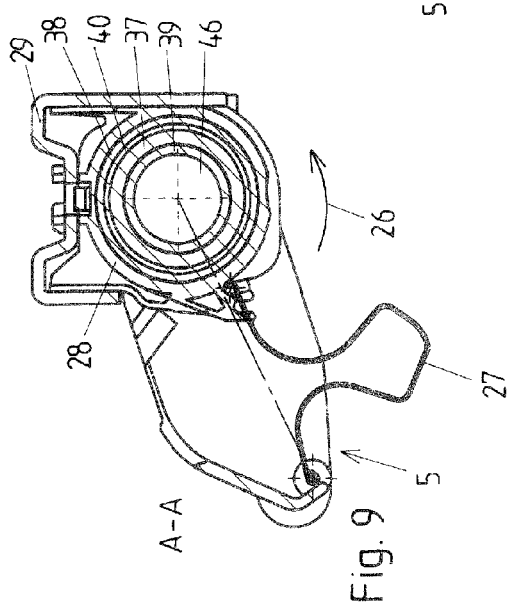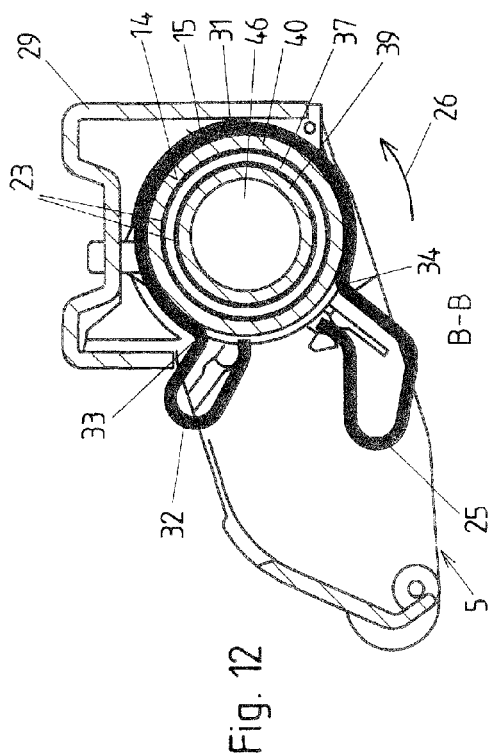

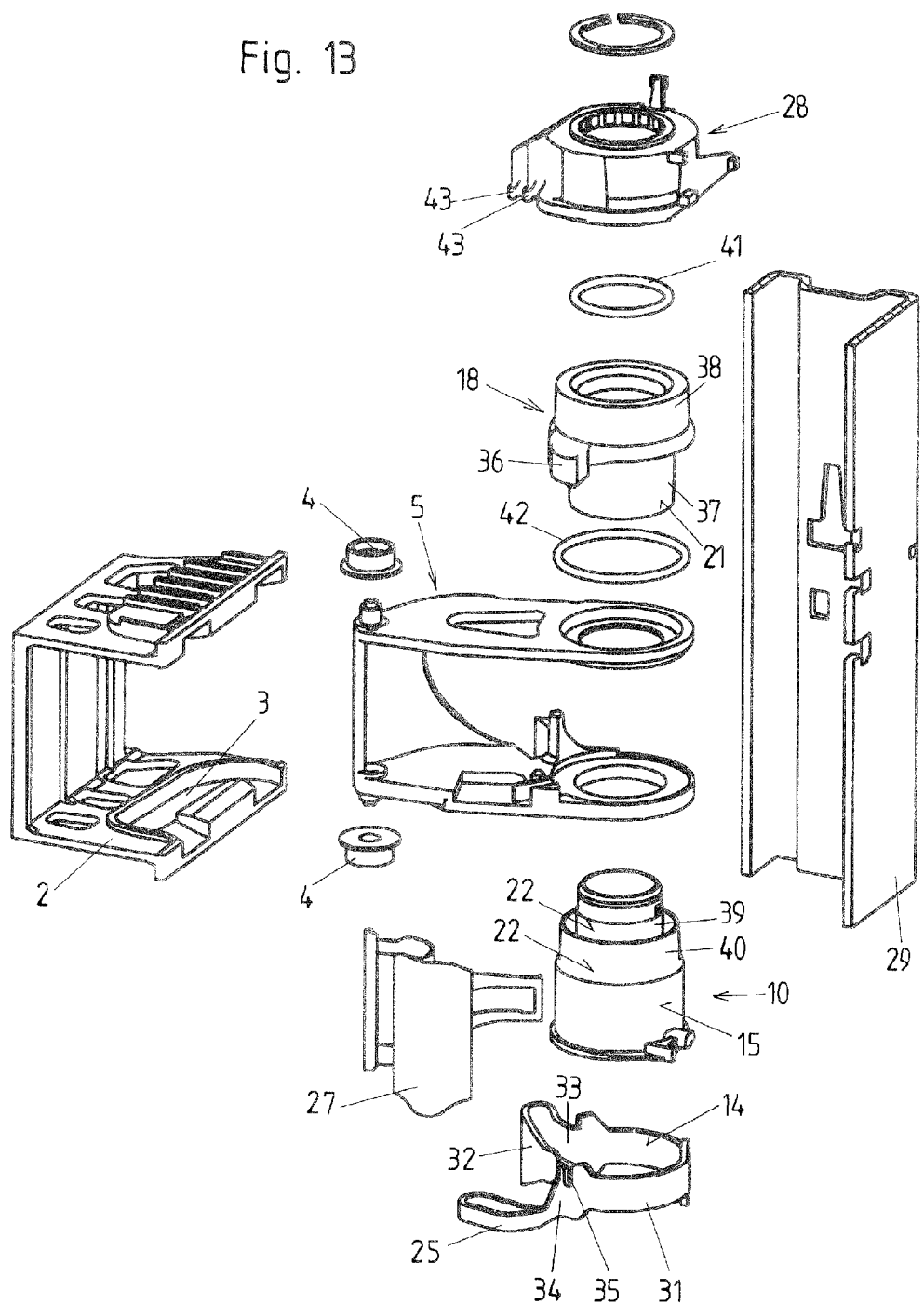

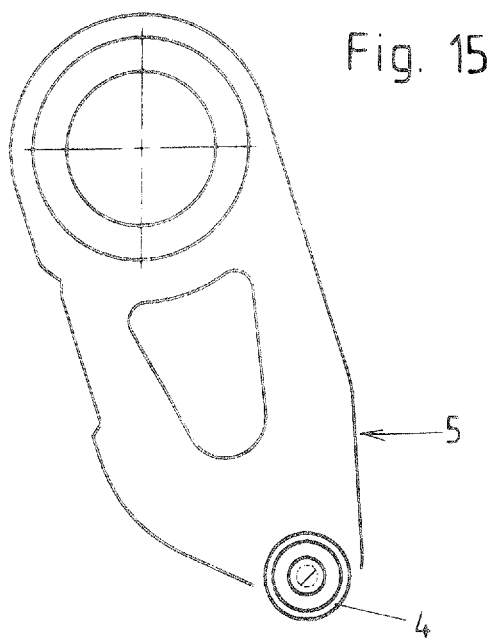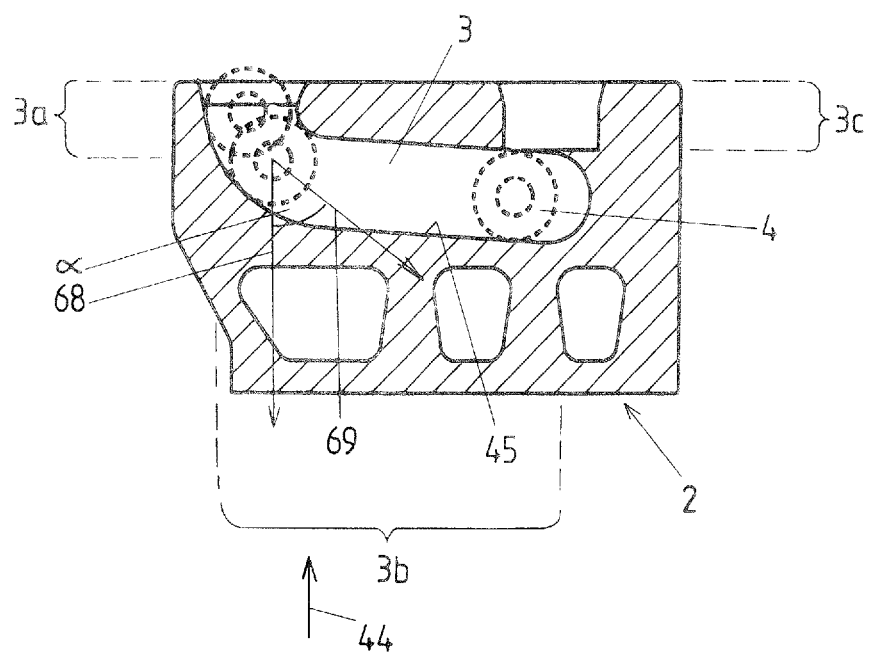

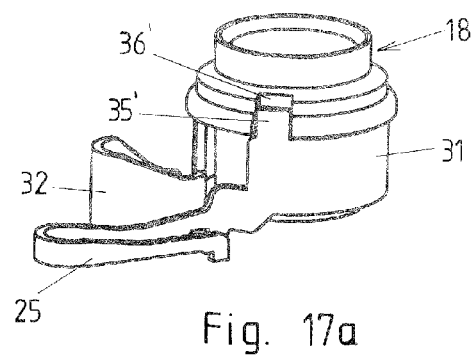
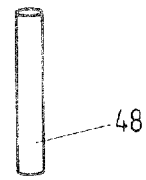
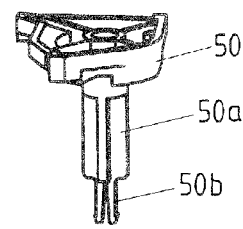
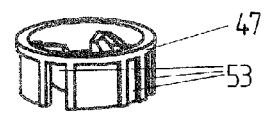
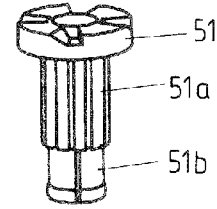
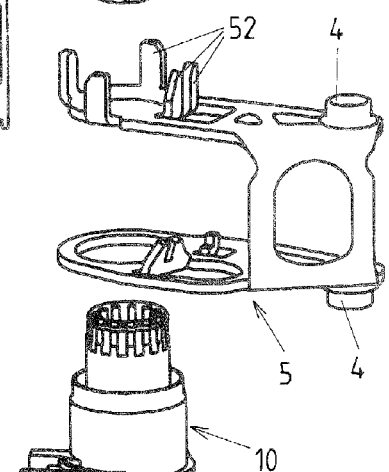
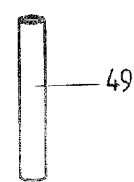
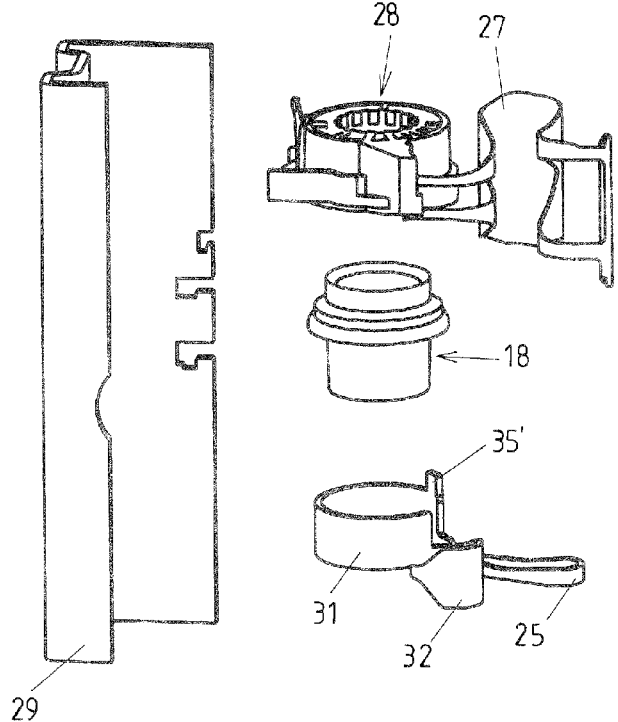

DEVICE FOR DAMPING THE MOVEMENT OF A MOVABLY MOUNTED COMPONENT

BACKGROUND

The invention relates to a device for damping the movement of a movably mounted component, comprising a first, mechanically acting braking device which has at least one friction pairing, in which, in order to generate a braking force, a driven friction surface is rotatable about an axis of the first braking device in relation to a secured friction surface bearing against said driven friction surface, and a second braking device which is coupled to the first braking device, wherein the friction surfaces of the friction pairing, or of at least one of the friction pairings, of the first braking device are pressed against each other as a function of a braking force exerted by the second braking device.

Various embodiments of damping devices, such as are used, for example, for damping movably mounted furniture parts, such as drawers, are known. For example, piston-cylinder units, in which at least one throughflow opening is provided in the piston and/or between the piston and the cylinder for a fluid flowing therethrough, for example a hydraulic fluid, are known. Dampers of this type are disclosed, for example, in DE 20 2005 020 820 U1 and DE 10 213 726 A1. Furthermore, rotation dampers, in which a highly viscous damping medium is arranged in a gap between a stationary damper part and a rotatably mounted damper part, are known. The braking force is brought about by said damping medium, which is subject to a shearing load. Dampers of this type are disclosed, for example, in DE 10 210 917 C1, U.S. Pat. No. 5,277,282 A, JP 59222631 A and U.S. Pat. No. 5,143,432 A.

An advantage of said previously known pneumatic, hydraulic and shearing frictional dampers is that the braking force which is brought about depends on the speed of movement of the component to be damped, and therefore a more rapidly moving component is damped to a greater extent, which is desirable in many applications. Disadvantages include the achievable braking forces, which are relatively low with reference to the overall size (in particular in the case of purely pneumatically acting dampers and shearing frictional dampers), the required seals (in particular in the case of hydraulic dampers) and the relatively high frictional forces which have to be overcome at low speeds of actuation of the damper. These are frictional forces which act independently of the braking action of the damper medium (i.e. empty friction).

Furthermore, the use of purely mechanically acting frictional dampers is known. For example, DE 19 938 626 A1, DE 201 16 197 U1 and JP 01266331 A disclose wraparound parts which surround an inner friction part and form a friction pairing therewith. Frictional dampers have the disadvantage that the braking force which they exert is basically independent of speed.

DE 10 313 659 B3, DE 10 214 596 A1, DE 19 717 937 A1, AT 503 877 B1 and EP 1 260 159 A2 disclose piston-cylinder units, in which an air pressure difference formed between the two piston sides acts on an elastically deformable piston part which is pressed to a greater or lesser extent onto the inside of the cylinder depending on the pressure difference. The frictional force acting between the elastic piston part and the inner wall of the cylinder thus depends on the pressure difference and therefore on the speed of the movement of the component to be damped. Linear dampers, in which a mechanically acting braking device is coupled to a pneumatically acting braking device which controls the braking force of the mechanically acting braking device, are therefore provided. Among the disadvantages of said previously known dampers is that first of all a pressure difference has to be built up until the braking force of the frictional damper begins, and this is associated with a time delay of greater or lesser length before the beginning of the damping action. Also, the damping characteristics are disadvantageous for many applications or can only be adapted with difficulty to various applications. A linear damper is also restricted to a limited actuating distance, or the dimensions of a linear damper have to correspond to the desired actuating distance.

A device of the type mentioned at the beginning, which is in the form of a vehicle shock absorber, is disclosed in DE 601 293 C. A wraparound part which is designed to be flexible bears frictionally against an inner friction part formed by a friction drum. One end of the wraparound part is connected to the vehicle axle to be damped. The other end of the wraparound part is connected to a hydraulic damping device. The latter is arranged within the friction drum and comprises wings which are mounted rotatably and are arranged in a chamber which contains a liquid. The liquid can pass from one side to the other side of the wing through holes in the wings. Alternatively, the holes can also be arranged in chamber walls which connect two chambers to each other. The frictional force of the rotatory frictional damper is therefore controlled by the hydraulic damper, and therefore, as a result, a totally speed-dependent braking characteristic is achieved. A disadvantage with this device is that the device has a relatively large overall size. Also, there have to be high-quality seals because of the high pressures occurring in the liquid. Seals of this type also cause friction, and therefore smooth running at low speeds of movement is limited (i.e. there is increased empty friction).

As mentioned, damping devices are frequently used for damping the entry movement of pull-out furniture parts, such as drawers and pull-out tall cabinets. These pull-out furniture parts are then customarily also equipped with a self-retracting device. The latter retracts the pull-out furniture part over a final section of the entry distance into the closed state of said furniture part, with the entry movement being damped by the damping device. Various embodiments of self-retracting devices have been disclosed. A conventional embodiment provides a spring-actuated tilting slide which interacts with a driver fitted on the pull-out furniture part and is adjusted by the driver between a basic position and a waiting position, which is taken up by the tilting slide in the pulled-out state of the pull-out furniture part. An example of such a self-retracting device, here in combination with a pull-out blocking device, is disclosed in EP 1 500 763 A2. GB 1 117 071 discloses a keeping-closed device, in which a spring-loaded catch arm is mounted pivotably about an axis and is pivoted between the basic position and the waiting position about said axis by the driver. The spring is moved here over a dead center.

If there are a plurality of pull-out furniture parts which are intended to be able to be pulled out only in an alternating manner, for example a plurality of drawers arranged one above another, pull-out blocking devices are used. A central locking can also be implemented via such pull-out blocking devices. In a frequent embodiment, there are blocking rods which have only a limited clearance for their displacement. An actuating part which interacts with at least one of the blocking rods is provided for each pull-out furniture part. When one of the pull-out furniture parts is pulled out, at least one of the blocking rods is displaced, and therefore the clearance is used up for the displacement of the blocking rods, and a further pull-out furniture part thus cannot be pulled out simultaneously. A pull-out blocking device of this type is disclosed, for example, in EP 1 500 763 A2, which has already been mentioned. GB 2 376 043 A discloses a pull-out blocking device in which the actuating parts are pivoted about axes, which lie parallel to the longitudinal extent of the blocking rods, and have cams interacting with the blocking rods.

Various further embodiments of pull-out blocking devices with blocking rods are known. For example, DE 29 620 152 U1, EP 1 336 709 A1 and WO 2008/107499 A1 show an actuation of the blocking rods by actuating parts which are pivoted about an axis at right angles to the blocking rods when the respective pull-out furniture part is pulled out. For example, GB 2 376 043 A discloses a pull-out blocking device in which the actuating parts are pivoted about axes, which lie parallel to the longitudinal extent of the blocking rods, and have cams interacting with the blocking rods.

SUMMARY

It is an object of the invention to provide a damping device of the type mentioned at the beginning which has a speed-dependent braking force, wherein a compact design of the device is made possible and the device friction to be overcome at low speeds of movement of the component to be damped is intended to be kept small. This is achieved by a device with one or more features of the invention.

In the case of the device according to the invention, a viscous damping medium is arranged in at least one gap in the second braking device, which gap is formed between a driven damper surface, which is rotatable about an axis of the second braking device, and a damper surface which is secured with respect to rotation about the axis. This damping medium which preferably completely fills the at least one gap brings about a braking force of the second braking device when the at least one damper surface, which is driven by the movement of the component to be damped, rotates in relation to the at least one secured damper surface.

The braking force brought about by the second braking device influences the braking force of the first, mechanically acting braking device, which could also be referred to as a rotational/frictional damper, via the coupling. For this purpose, the mutual contact pressure (i.e. press-on force) of the friction surfaces of the friction pairing, or of at least one of the friction pairings, changes as a function of the braking force of the second braking device, wherein the contact pressure rises with increasing braking force of the second braking device. The coupling thus produces an operative connection, which acts between the second and the first braking device, directly or via at least one coupling part located in between. A compact, cost-effective damper with advantageous braking characteristics can be provided by the invention, wherein the level of the braking force depends on the speed of the component to be damped. Low empty friction can be achieved. Since the first and second braking devices are in the form of rotational dampers, it is optionally possible for damping over a basically unlimited path to be achieved.

If the first braking device comprises more than one friction pairing, said friction pairings are preferably all rotatable about the same axis (i.e. coaxially). If the second braking device comprises more than one driven damper surface, said damper surfaces are preferably all rotatable about the same axis (i.e. coaxially).

The axis of the first braking device, about which the at least one driven friction surface of the first braking device is rotatable, advantageously coincides with the axis of the second braking device (i.e. corresponds thereto), about which the at least one driven damper surface of the second braking device is rotatable, i.e. the at least one driven friction surface of the first braking device and the at least one driven damper surface of the second braking device are therefore rotatable about the same axis or coaxial. A simple, compact design is thereby achieved.

The friction pairing, or at least one of the friction pairings, of the first braking device advantageously has a coefficient of sliding friction of at least 0.2, preferably at least 0.3.

The viscosity of the viscous damping medium of the second braking device is advantageously more than 20 000 Pa·s, preferably more than 50 000 Pa·s, wherein values in the range of 100 000 to 1 000,000 Pa·s are particularly preferred.

The gap width of the gap, or of at least one of the gaps, preferably of all of the gaps in which the damping medium is arranged, is advantageously in the range of 0.1 mm to 0.5 mm, i.e. the damping medium has such a layer thickness.

The damping force is brought about by the damping medium arranged in the at least one gap by the fact that said damping medium is subject to a shearing mode. The gap or said gaps having the damping medium preferably extend annularly around the axis of the second braking device.

Relatively simply designed seals, if any at all, can be used in order to retain the damping medium in the gap or in the respective gap. Seals may optionally be entirely omitted in the case of non-flowable grease. In the case of flowable oils, seals which prevent the oil from escaping are required, the seals not being subjected to any high pressures.

In an advantageous embodiment of the invention, the first braking device comprises a wraparound part which is designed to be flexible, preferably to be elastically bendable, or a wraparound unit which comprises at least two jaw parts connected to each other in an articulated manner. The wraparound part or the wraparound unit surrounds an inner braking part over a part of the circumference thereof which amounts to at least more than 90°, preferably at least 180°, particularly preferably at least 250°. The wraparound part or the wraparound unit preferably extends over at most 500°, particularly preferably over at most 330°, around the inner braking part. The wraparound part or the wraparound unit and the inner braking part form the friction pairing, or at least one of the friction pairings of the first braking device.

The coupling to the second braking device can advantageously take place here by a rear end of the wraparound part or of the wraparound unit being directly or indirectly connected to a part of the second braking device that transmits a braking force, which is brought about by the second braking device, to the wraparound part or the wraparound unit. This part of the second braking device can in particular be in the form of a damper sleeve which has at least one of the damper surfaces of the second braking device. The term "rear end" refers to the relative movement between the wraparound part or the wraparound unit and the inner braking part. In this case, either the wraparound part or the wraparound unit can be driven by the component to be damped and can rotate in one direction of rotation in relation to the inner braking part, or the inner braking part can be driven and can rotate in an opposed direction of rotation in relation to the wraparound part or the wraparound unit.

In another possible embodiment, at least one driven friction part which is rotatable about the axis of the first braking device has the driven friction surface, or at least one of the driven friction surfaces, and at least one friction part which is secured against revolving about the axis has the secured friction surface, or at least one of the secured friction surfaces, and at least one driven damper part which is rotatable about the axis of the second braking device has the driven damper surface, or at least one of the driven damper surfaces, and at least one damper part which is secured against revolving about the axis has the secured damper surface, or at least one of the secured damper surfaces, wherein the driven damper part, or one of the driven damper parts, is driven by a connection to the driven friction part, or to one of the driven friction parts, or to a part connected thereto for rotation therewith, via a coupling spring, or wherein the secured damper part, or one of the secured damper parts is secured by a connection to the secured friction part, or to one of the secured friction parts, or to a part connected thereto for rotation therewith, via a coupling spring. As a result, when damping of the movement of the movably mounted component is carried out, a greater or lesser angular offset between the two parts connected by the coupling spring occurs, depending on the speed of movement of the component to be damped. Interacting control surfaces adjust the contact pressure between the friction surfaces of the friction pairing, or of at least one of the friction pairings, as a function of said angular offset, or, in other words, the interacting control surfaces convert said angular offset into an angular-offset-dependent contact pressure between the friction surfaces.

A device according to the invention is suitable for damping different types of movably mounted components, in other words for exerting a braking force on different types of movably mounted components. The movement of a linearly movably mounted component, for example of a linearly movably mounted furniture part, such as a drawer or a pull-out cabinet unit, or the movement of a rotatably mounted component, for example of a door or a flap in the form of a furniture part or as a part in or on a vehicle, can be damped. Various other types of linearly or rotatably movably mounted parts, such as machine parts, can likewise be damped by a device according to the invention.

High damping forces can be applied by a device according to the invention, and therefore the device can be used, for example, for damping the pushing-in movement of heavy-load pull-out mechanisms. In the case of heavy-load pull-out mechanisms, pull-out furniture parts, of which one, more than one or all are loadable with more than 150 kg, are provided.

BRIEF DESCRIPTION OF THE DRAWINGS

Further advantages and details of the invention are explained below with reference to the attached drawings, in which:

FIG. 9 shows a section along the line A-A from FIGS. 8 and 8a;

FIGS. 10 and 11 show sections corresponding to FIG. 9, but in an intermediate position and in the catch-arm main position, which is taken up in the refracted state of the pull-out furniture part;

FIG. 12 shows a section along the line B-B of FIGS. 8 and 8a;

FIG. 13 shows an exploded illustration;

FIG. 15 shows an illustration for explaining the entry movement of the catch arm of the device into the slotted guide of the driver;

FIG. 17 shows an exploded illustration of this modified embodiment;

FIG. 17a shows a perspective view of the wraparound part, which is in engagement with the damper sleeve, from a different viewing direction than FIG. 17;

DETAILED DESCRIPTION OF THE PREFERRED EMBODIMENTS

Figure 1:
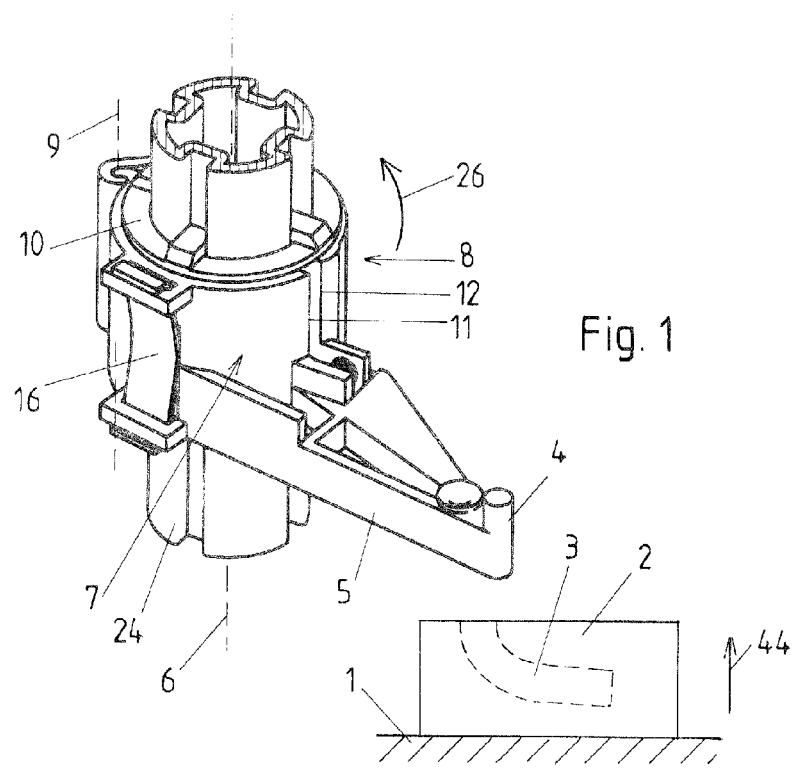
FIG. 1 shows a perspective view of a first embodiment of a device according to the invention.
Figure 2:
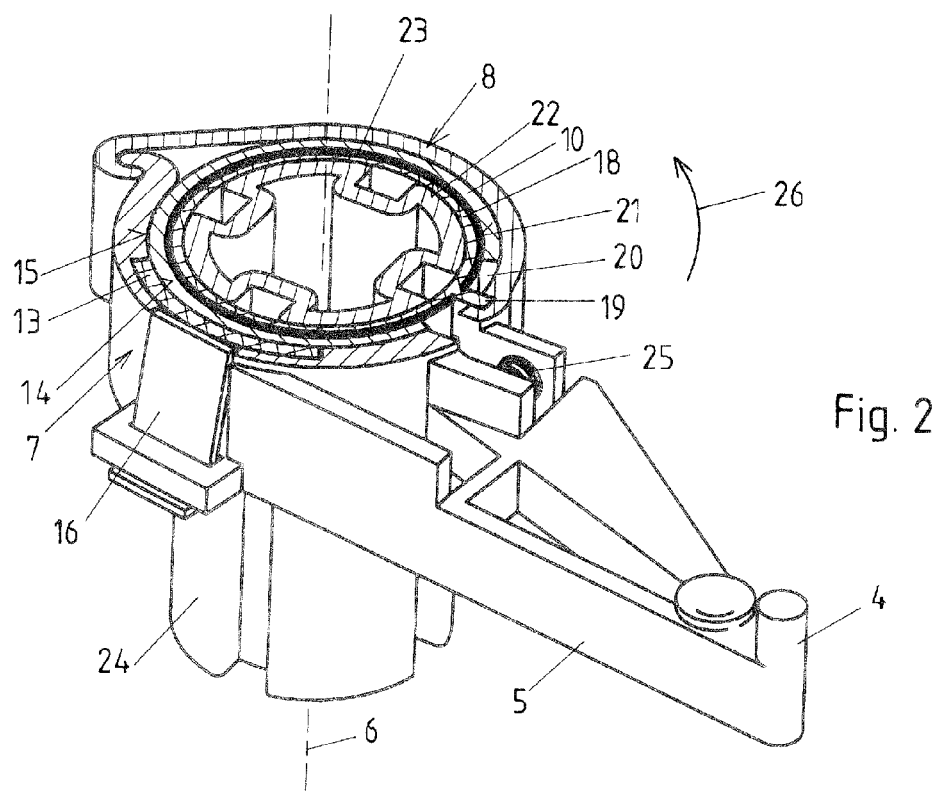
FIG. 2 shows a perspective view corresponding to FIG. 1 of the device cut open transversely.
Figure 3:
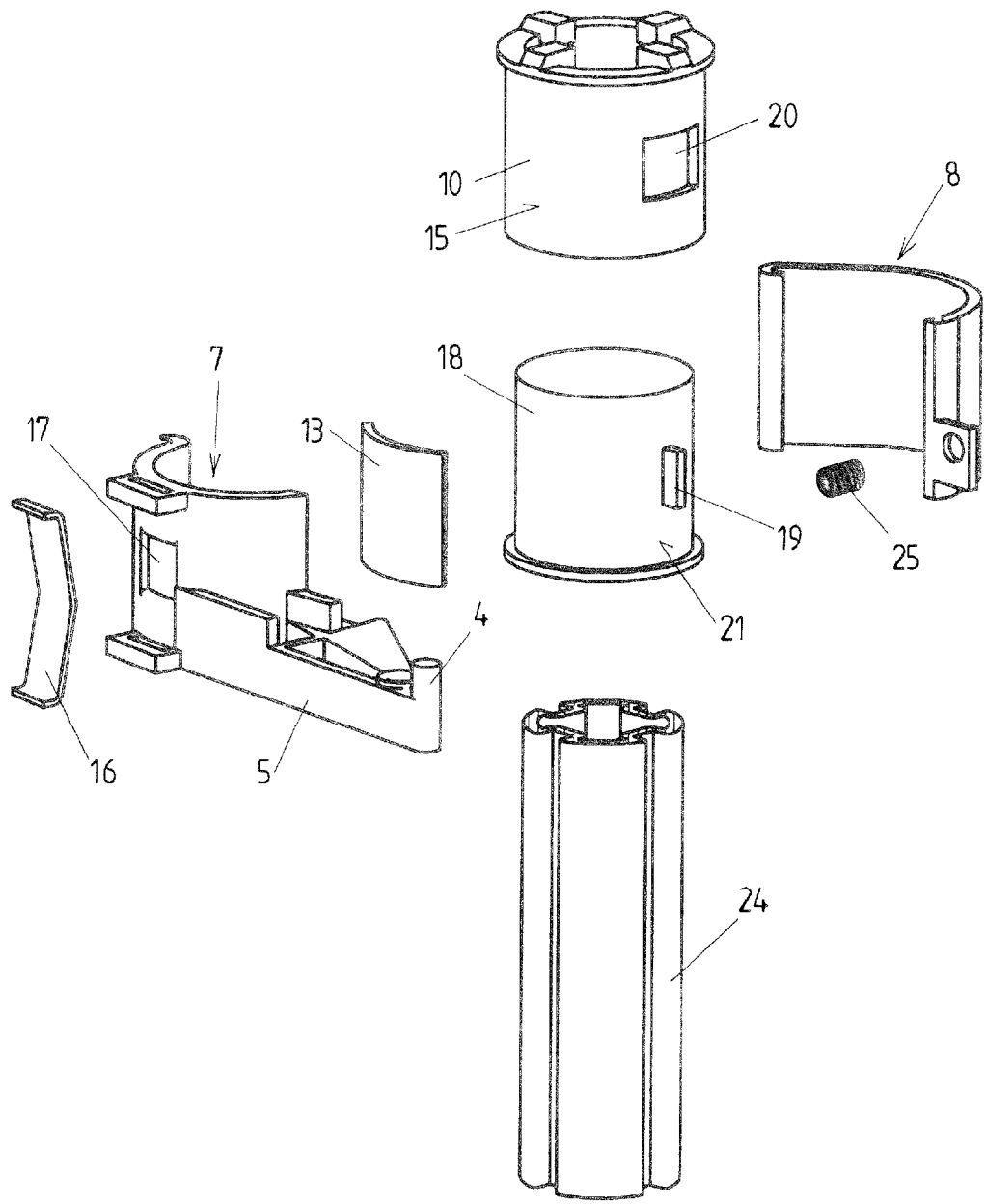
FIG. 3 shows an exploded illustration.
Figure 4:
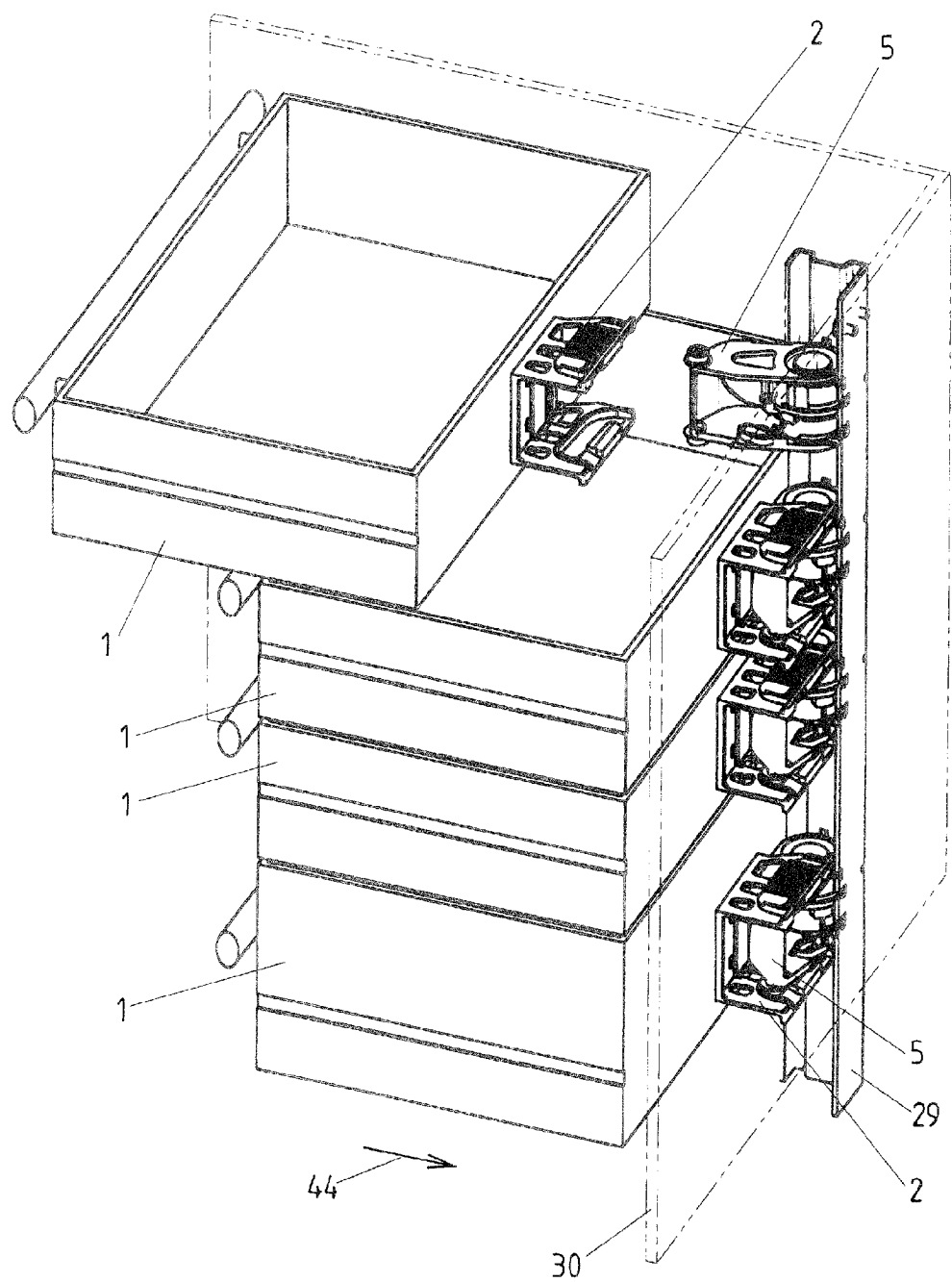
FIG. 4 shows a perspective view of devices according to the invention according to a second embodiment in a use for damping the pushing-in movement of pull-out furniture parts.
Figure 5:
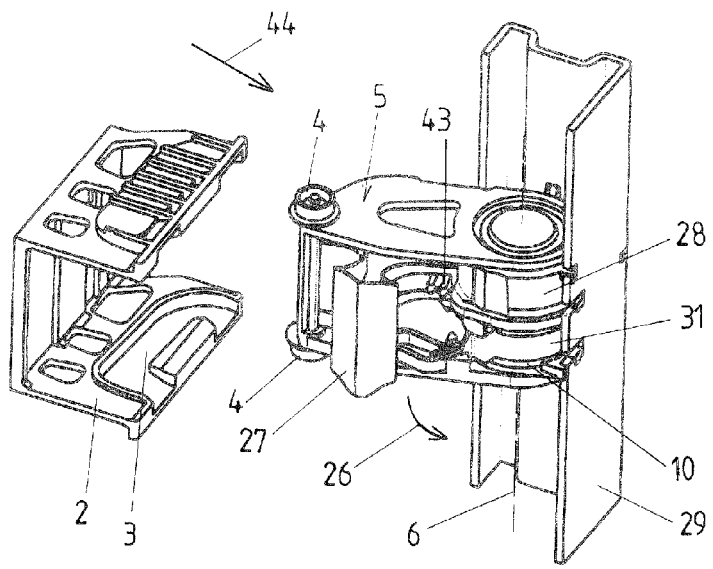
FIG. 5 shows a perspective view of one of the devices from FIG. 4, in the catch-arm waiting position, which is taken up in the pulled-out state of the pull-out furniture part, with a fastening rail.
Figure 6:
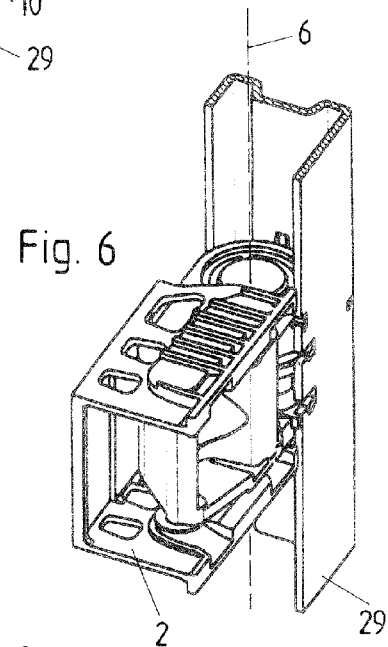
FIG. 6 shows a perspective view corresponding to FIG. 5 in the state which is present in the retracted state of the pull-out furniture part.
Figure 7:
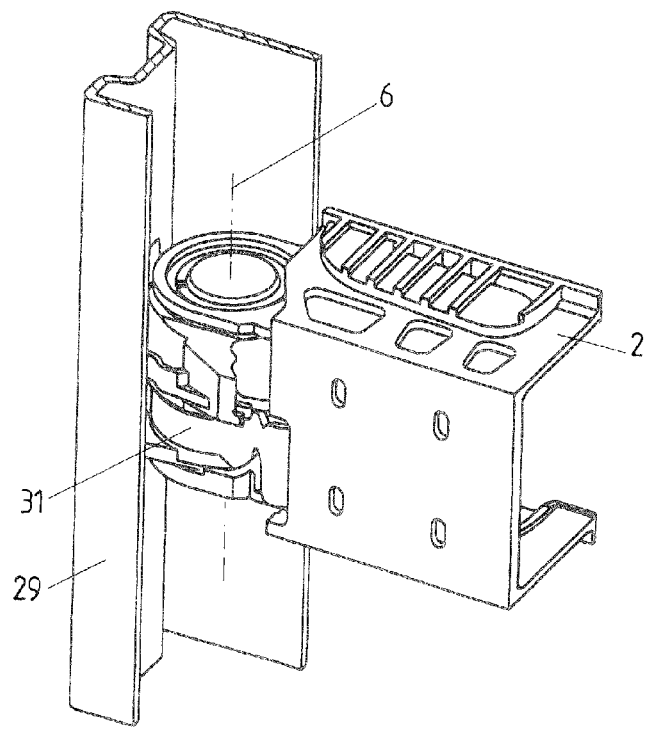
FIG. 7 shows a perspective view corresponding to FIG. 6, but from a different viewing angle.
Figure 8A:
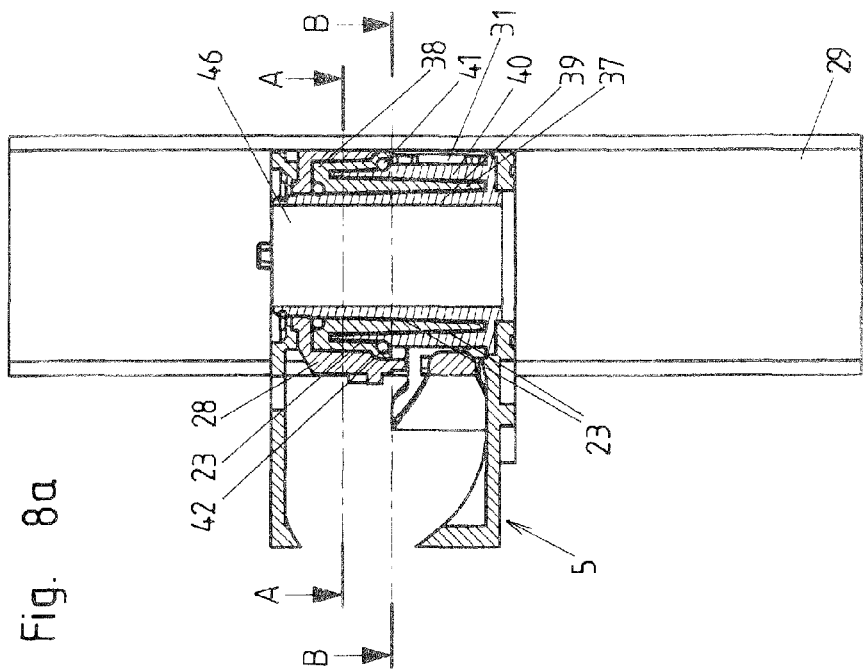
FIG. 8a shows an illustration corresponding to FIG. 8, but in the longitudinal center section of the device.
Figure 8:
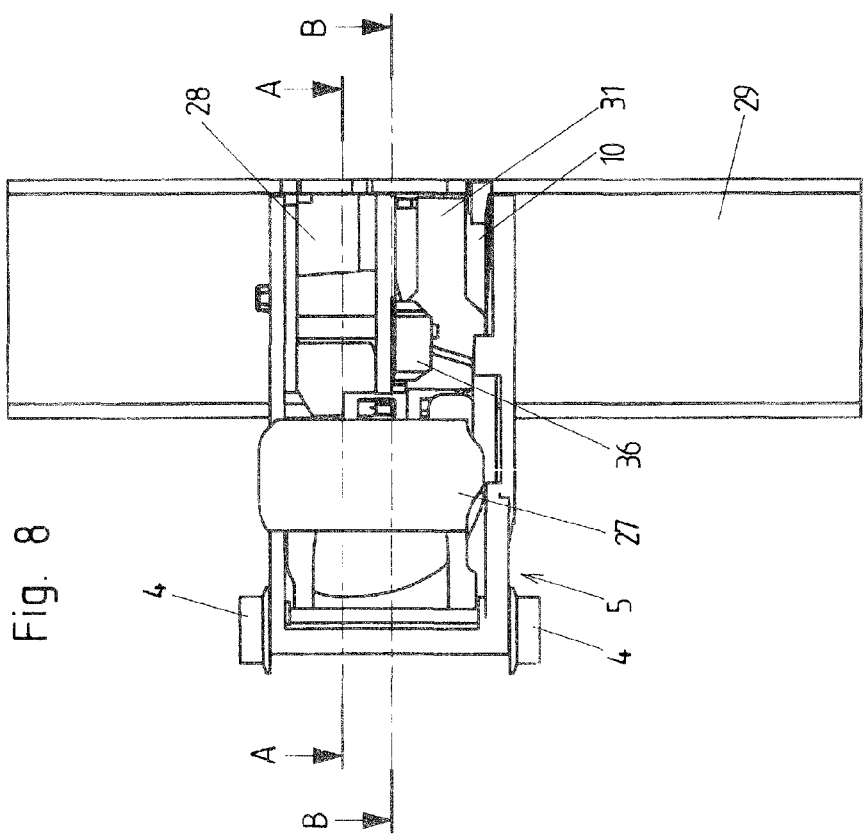
FIG. 8 shows a view of the device fastened to the rail, with the catch arm in the waiting position.

A first embodiment of a device according to the invention is illustrated in FIGS. 1 to 3.

The device serves for damping the movement of a movably mounted component 1, which is only indicated schematically in FIG. 1. The driver 2 (likewise only indicated schematically) which has a slotted guide track 3 formed by a depression is arranged on the component 1. In order to damp the movement of the component 1 in the direction of movement 44, a projection 4 which is arranged on a catch arm 5 (i.e. catch lever) enters the slotted guide track 3, wherein the catch arm 5 is rotated about the axis 6 in the direction of the arrow 26 and, in the process, is braked and therefore brakes the movement of the component 1. In the exemplary embodiment, the projection 4 is formed by a pin, but could also be formed, for example, by a roller. A design the other way around (projection on the driver, recess on the catch arm) is also possible. Carry-along connections which are in a different form, for example a recess which is of substantially V-shaped design and into which a projection enters, in order to rotate the catch arm 5 by the driver 2 running up thereagainst, are also possible. Different types of possible carry-along connections are known, for example, from conventional pull-out furniture parts with self-retracting devices.

The catch arm 5 is fitted on a front jaw part 7 or is formed integrally therewith. The front jaw part 7 is connected in an articulated manner to a rear jaw part 8, and therefore the jaw parts 7, 8 are pivotable in relation to each other at least to a limited extent about a pivot axis 9 which lies parallel to the axis 6.

The front and the rear jaw parts 7, 8 together form a wraparound unit which surround an inner braking part 10 over a large part of the circumference thereof. In the exemplary embodiment, the wraparound unit surrounds the inner braking part 10 over the entire circumference thereof, apart from a gap which lies between the front end 11 of the front jaw part 7 that is remote from the articulated connection to the rear jaw part and the rear end 12 of the rear jaw part 8 that is remote from the articulated connection to the front jaw part 7. This gap preferably extends over less than 45° with respect to the angle about the axis 6.

The inside of a basic part of the front jaw part 7 has a depression in which a brake lining 13 is arranged. The inner surface (i.e. directed toward the axis 6) of said brake lining forms a driven friction surface 14 which bears against the outer surface (i.e. directed away from the axis 6) of the inner braking part 10, which surface forms a secured friction surface 15. The inner braking part 10 is secured against rotation about the axis 6, by means of, in the exemplary embodiment, a rotationally fixed connection to the shaft 24 which is mounted for rotation therewith.

The friction surfaces 14, 15 form a friction pairing, as a result of which a braking force, the magnitude of which depends on the mutual contact pressure force of the friction surfaces 14, 15, is opposed to the rotation of the driven friction surface 14 about the axis 6. The brake lining 13 is pressed onto the inner braking part 10 by a press-on spring 16, wherein, in the exemplary embodiment shown, a curved leaf spring which is held by the front jaw part on the outside thereof and acts upon the brake lining 13 through an opening 17 in the basic part of the front jaw part 7, is provided for this purpose.

The device therefore has a first, mechanically acting braking device which is in the form of a rotational damper and which comprises the wraparound unit, which comprises the front and the rear jaw parts 7, 8, and the inner braking part 10. The braking force of said first braking device is adjusted (i.e. controlled) by a second braking device as a function of the speed of movement of the component 1 to be damped, as is explained below.

The rear jaw part 8 is connected to a damper sleeve 18, and therefore, when the rear jaw part 8 is rotated about the axis 6, the damper sleeve 18 is likewise rotated about the axis 6 by the rear jaw part 8. For this purpose, in the exemplary embodiment, the damper sleeve 18 has a driver lug which projects outward through a window recess 20 in the inner braking part 10 and engages in a depression in the rear jaw part 8. A design the other way around (driver lug on the rear jaw part 8, depression in the damper sleeve 18) is, for example, also possible. The damper sleeve 18 is rotatable in relation to the inner braking part 10 over the angular range predetermined by the window recess 20, over approximately 45° in the exemplary embodiment shown, with larger or smaller angular ranges also being possible.

The outer surface (directed away from the axis 6) of the damper sleeve 18 forms a driven damper surface 21. The inner surface (directed towards the axis 6) of the inner braking part 10 forms a secured damper surface 22. The damper surfaces 21, 22, which are of cylindrical design in particular at least over a part of the circumference thereof (in the exemplary embodiment shown, over the entire circumference thereof, apart from the regions of the driver lug 19 and the window recess 20), enclose a gap in which a viscous damping medium, which is in the form here of a non-flowable grease, is arranged. When the driven damper surface 21 is rotated in relation to the secured damper surface 22, the shearing friction acting on the damping medium 23 results in a braking force.

The device therefore comprises a second braking device which is in the form of a rotational damper and comprises the damper sleeve 18 and the inner braking part 10 and also the damping medium 23 arranged in the gap therebetween.

Instead, the damping medium 23 could be arranged in the gap between the damper sleeve 18 and the stationary shaft 24. The driven damper surface would then be formed by the inner surface of the damper sleeve 18 and the secured damper surface would then be formed by the outer surface of the shaft 24 and the second braking device would then comprise the damper sleeve 18 and the stationary shaft 24. A viscous damping medium 23 could also be arranged both in the gap between the damper sleeve 18 and the inner braking part 10 and in the gap between the damper sleeve 18 and the shaft 24, and therefore, in this case, the second braking device would comprise all of said parts and there would be two driven damper surfaces and two secured damper surfaces.

The braking force exerted by the second braking device brakes the rotation of the damper sleeve 18 about the axis 6. As a result, during the rotating of the wraparound unit about the axis 6, a retaining force is exerted on the rear jaw part 8, specifically all the more so, the greater the rotational speed of the wraparound unit about the axis 6. As a result, the front and the rear jaw parts 7, 8 are compressed to a greater or lesser extent, wherein the brake lining 13 is displaced outward against the press-on spring 16 to a greater or lesser extent, and the press-on spring 16 is thereby tensioned and therefore the mutual press-on force of the friction surfaces is increased. As a result, the braking force of the first braking device increases as the speed of the component 1 rises.

When a maximum press-on force of the brake lining 13 against the inner braking part 10 is achieved, those regions of the inner surface of the front jaw part 7 that lie next to the brake lining 13 bear against the inner braking part 10 when the jaw parts 7, 8 are further pressed together. However, the mutual coefficient of friction of these interacting surfaces is substantially smaller than the coefficient of friction of the friction pairing. As a result, the press-on force of the brake lining 13 against the inner braking part 10 is limited, and hence, on a further increase in the speed of the component 1, the entire braking force of the device is only slightly increased further, if at all.

A holding-open spring 25 is located between the ends 11, 12 of the wraparound unit. If, starting from the rest state, the front jaw part 7 is rotated with increasing speed about the axis 6, the force of the holding-open spring 25 has to be overcome first before the jaw parts 7, 8 are pressed together. For this purpose, the holding-open spring 25 can be pretensioned (for the sake of simplicity, a limitation to pushing the ends 11, 12 apart is not illustrated in the figures). As a result, at low speeds of the component 1, the braking force exerted by the device can be kept small.

In the rest state, the press-on spring 16 presses the brake lining 13 against the secured friction surface 15 preferably only with a small force or not at all.

The rear jaw part 8 could likewise be equipped with a brake lining which, for example, could be spring-loaded, analogously to the brake lining 13 of the front jaw part 7.

In modified embodiments, the spring loading of the at least one brake lining could also be omitted.

In the embodiment shown, away from the region of the driven friction surface 14, which is formed by the at least one brake lining 13, the inner surfaces of the front and rear jaw parts 7, 8 have relatively small coefficients of friction in relation to the outer surface of the inner braking part 10, and therefore said surface regions scarcely contribute (to less than 10%) to the braking force exerted by the first braking device. In modified embodiments, separate brake linings could also be omitted and single-part jaw parts 7, 8, or at least one of said jaw parts, could directly form at least one friction surface of the first braking device. Suitable materials of the respective jaw part and of the inner braking part could be selected for this, and/or a coating of the respective jaw part and/or of the inner braking part could be provided. It is also possible for the inner braking part to be formed with at least one brake lining formed by a separate part.

The wraparound unit could also comprise more than two jaw parts which are connected to one another in an articulated manner about axes lying parallel to the axis 6.

In a modification of the first embodiment, the wraparound unit having the jaw parts 7, 8 could also be secured against rotation about the axis 6. For this purpose, it may be envisaged that the catch arm 5 is secured against rotation about the axis 6. In actual fact, in such an embodiment, the catch arm 5 will be able to be omitted and the securing against rotation about the axis 6 will be formed by a modified design. In this modified embodiment, the component to be damped would rotate the shaft 24, specifically in a direction of rotation opposed to the arrow 26. The friction surface 15 of the inner braking part 10 would then be the driven friction surface, and the friction surface 14 of the wraparound unit would then be the secured friction surface.

A second embodiment of a device according to the invention is illustrated in FIGS. 4 to 15. The device is used here for damping the pushing-in movement of movably mounted components 1, which are formed by drawers, with the pull-out guides for the drawers not being illustrated. The device can also be used in an analogous manner for damping the pushing-in movement of other pull-out furniture parts. A retracting spring 27 is additionally integrated here in the device in order to provide a self-retracting mechanism for the pull-out furniture part over the final part of the entry path.

Substantially identically acting or at least analogous parts are largely denoted by the same reference numbers as in the first embodiment. A driver 2 which has slotted guide tracks 3 which, as illustrated, can be formed by depressions or else by passage openings, is fitted on the rear side of a respective component 1 to be damped. A catch arm 5 of the device has projections 4 which are formed here by rollers and interact with the slotted guide tracks 3. A U-shaped design of the driver 2 with opposite slotted guide tracks 3, which each interact with a projection 4, is preferred, wherein an individual slotted guide track 3 interacting with a projection 4 could also be provided. A design the other way around, in which at least one slotted guide track is provided on the catch arm and at least one projection is provided on the driver, is also possible.

In the pushed-in state of the pull-out furniture part (cf. the three lower drawers in FIG. 4 and FIGS. 6, 7 and 11), the catch arm 5 takes up the main position thereof. When the pull-out furniture part is pulled out in the pull-out direction 68, the catch arm 5 is pivoted about the axis 6 until the catch arm takes up the waiting position thereof (cf. the upper drawer in FIG. 4, and FIGS. 5, 8, 9 and 12). In this position of the catch arm 5, the driver 2 decouples from the catch arm 5. When the pull-out furniture part is pushed in (movement in the direction of the arrow 44), the driver 2 couples to the catch arm 5, which is in the waiting position thereof, whereupon the catch arm 5 rotates back about the axis 6 until the catch arm takes up the main position again and the pull-out furniture part is fully pushed in.

Other embodiments of the driver 2 and of the catch arm 5 in order to permit such a coupling and decoupling with the pivoting of the catch arm between the main position thereof and the waiting position thereof are also possible. Various types of possible carry-on connections are known, for example, from conventional pull-out furniture parts with automatic retracting mechanisms.

The operating principle of the device is similar to in the previously described, first embodiment, with the expansions and differences described below.

The inner braking part 10 and a housing part 28 which is placed onto the latter are connected non-rotatably to the rail 29 which, for its part, is fastened to the furniture body 30. The fastening to the rail 29 preferably takes place by means of latching projections of the inner braking part 10 and of the housing part 28, which engage in recesses in the rail 29. A fastening of the device directly to the furniture body 30 is also conceivable and possible.

Figure 14:
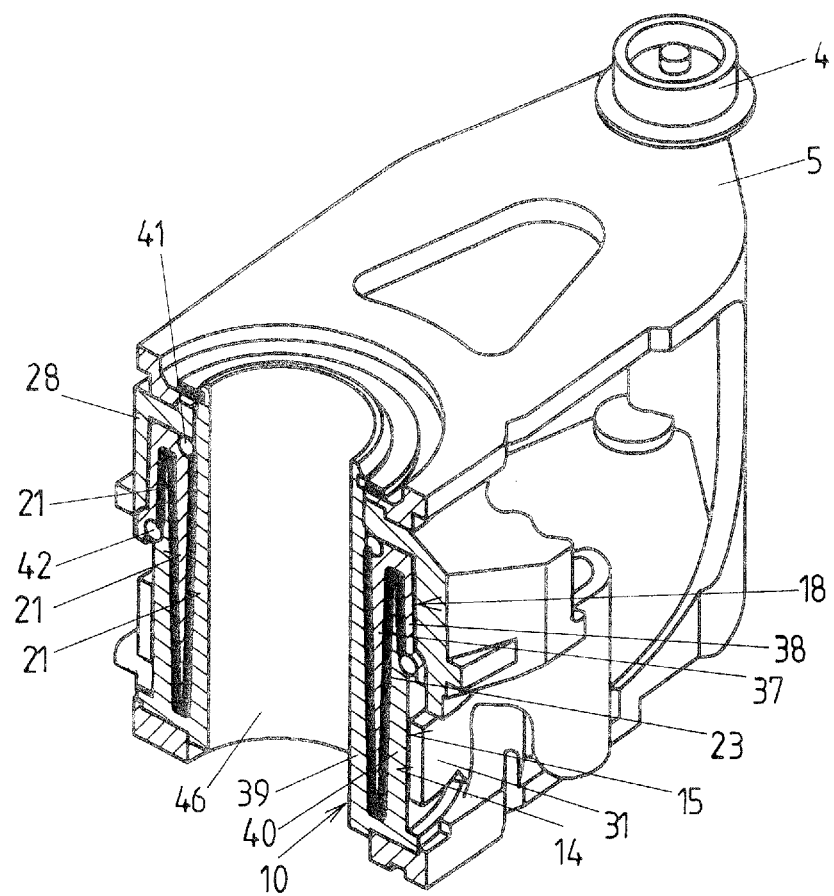
FIG. 14 shows a perspective view of the device cut open in a section running parallel to the axis and through the axis.

The unit formed by the inner braking part 10 and by the housing part 28 preferably has an inner cavity through which said unit completely passes axially (cf. FIG. 14). Said cavity can receive parts of a pull-out blocking device, as is described further below with reference to FIGS. 16 and 17.

The catch arm 5 is mounted rotatably about the axis 6 at the unit formed by the inner braking part 10 and the housing part 28.

The catch arm 5 is connected to a wraparound part 31 which is pre-shaped, but is flexible because of the elasticity thereof, and therefore, when the catch arm 5 rotates about the axis 6 in the direction of the arrow 26, the wraparound part 31 is likewise rotated about the axis 6. In the exemplary embodiment, the wraparound part 31 is formed by a band and runs around the inner braking part 10 over a large part of the circumference thereof. The inner surface (i.e. facing the axis 6) of the wraparound part 31 forms a driven friction surface 14 which, in order to generate a braking force, interacts with the outer surface (i.e. directed away from the axis 6) of the inner braking part 10, which surface forms a secured friction surface 15 (in the exemplary embodiment, this is the lower section of the wall 40). The driven friction surface 14 and the secured friction surface 15 form the friction pairing of the first, mechanically acting braking device, which comprises the wraparound part 31 and the inner braking part 10.

The catch arm 5 is connected to the wraparound part 31 via an overload spring 32, which, in the exemplary embodiment shown, is formed integrally with the wraparound part 31 and is formed by a section, with a curved or loop-shaped profile, of the band forming both the wraparound part 31 and the overload spring 32. The geometry of said curved or loop-shaped profile and the elasticity of this section of the band are configured in such a manner that a spring element having the desired spring characteristic is produced. In modified embodiments, the overload spring 32 can also be formed by a separate part which is arranged in the transmission path between the catch arm 5 and the at least one driven friction surface 14 of the first braking device. Instead or in addition, an overload spring could also be arranged at a different point in the transmission path of the force which is transmitted from the component to be damped to the device and which drives the device, for example could also be arranged between the inner braking part 10 and the rail 29. In other embodiments, an overload spring can also be omitted.

The transition between the wraparound part 31 and the overload spring 32 can be considered to be the front connecting point 33 of the wraparound part 31, at which the movement, which is to be damped, of the component 1 is introduced into the wraparound part 31.

At a rear connecting point 34, the wraparound part 31 is connected to a damper sleeve 18. In this connection, in the exemplary embodiment shown, an axial projection of the wraparound part 31, which projection has a slot 35, is pushed into a recess in the region of that side of a radial projection 36 of the damper sleeve 18 which is at the bottom in FIG. 13, with the slot 35 engaging in a web arranged in said recess (the recess of the radial projection 36 and the web arranged therein are not visible in FIG. 13).

Between the front connecting point 33 and the rear connecting point 34, the wraparound part 31 extends around the inner braking part 10 over more than 90°, preferably over more than 180°, particularly preferably over more than 250°, in a first direction of rotation (opposed to the arrow 26) with respect to the axis 6. In the exemplary embodiment shown, this extension is less than 360°. An extension by more than 360° is possible, i.e. the wraparound part then has more than one complete turn, said wraparound part running helically around the inner braking part 10.

The rear connecting point 34 of the wraparound part 31 is connected to the catch arm 5 via a holding-open spring 25. In this exemplary embodiment, said holding-open spring 25 is formed integrally with the wraparound part 31 and is formed by a section, which has a curved or loop-shaped profile, of the band, which also forms the wraparound part 31 and optionally the overload spring 32. The geometry of the curved or loop-shaped profile and the elasticity of said section of the band are matched to a desired spring characteristic. The function of the holding-open spring 25, which, during the damping of the movement of the component 1, acts upon the rear connecting point of the wraparound part in relation to the front connecting point of the wraparound part in the direction of rotation 26 (this is the opposed direction of rotation in which the wraparound part extends from the front connecting point to the rear connecting point about the axis 6), is at least substantially analogous to the holding-open spring described in the first exemplary embodiment and is described more precisely further below.

The holding-open spring 25 could also be formed by a separate part or could also be omitted.

The overload spring 32 is substantially harder, preferably more than 10 times harder, than the holding-open spring 25.

In this exemplary embodiment, the damper sleeve 18 has a wall 37 which engages in a slot between an inner and an outer wall 39, 40 of the inner braking part 10. Furthermore, the damper sleeve 18 has a wall 38 which engages over an upper section of the outer wall 40 of the inner braking part 10. The inner and outer surfaces of the wall 37 of the damper sleeve 18 and the inner surface of the wall 38 of the damper sleeve 18 form driven damper surfaces 21. The outer surface of the wall 39 of the inner braking part 10, the inner surface of the wall 40 of the inner braking part 10 and the upper section of the outer surface of the wall 40 of the inner braking part 10 form secured damper surfaces (the lower section of the wall 40 forms the secured friction surface 15). An annular gap in which a viscous damping medium 23 is arranged is located in each case between the driven damper surfaces 21 and the secured damper surfaces 22. Sealing rings 41, 42 limit the gap between the outer surface of the wall 39 and the inner surface of the wall 37 at the upper end and the gap between the upper section of the outer surface of the wall 40 and the inner surface of the wall 38 at the lower end thereof, and therefore a sealed space is formed. A flowable oil can then be used as the damping medium. However, the use of a non-flowable grease is likewise possible. The sealing rings 41, 42 could then in principle also be omitted.

The second braking device therefore comprises the damper sleeve 18, the inner braking part 10 and the damping medium 23.

By means of the rotation of the catch arm 5 about the axis 6 in the direction of rotation corresponding to the arrow 26, the wraparound part 31 is rotated about the axis 6, as a result of which, by the connection of the wraparound part 31 to the damper sleeve 18, the latter is rotated about the axis 6. The axis 6 therefore forms both the axis of rotation of the first braking device and the axis of rotation of the second braking device. Depending on the speed of rotation of the damper sleeve 18 about the axis 6, the second braking device exerts a braking force of greater or lesser size, as a result of which a tensile force of greater or lesser size acts between the front connecting point 33 and the rear connecting point 34 of the wraparound part 31. Depending on the size of said tensile force, the driven friction surface 14 is pressed to a greater or lesser extent onto the secured friction surface 15.

In the rest state of the device, the wraparound part 31 is advantageously at a distance, at least in sections, from the secured friction surface 15. Due to the pre-shaping of the wraparound part 31 in the rest state, the latter, over at least substantially the entire course of the friction surface 14, i.e. at least over 90% of the extent thereof in the circumferential direction, is preferably at a distance from the friction surface 15 of the inner braking part 10.

Through the elasticity of the wraparound part 31 and/or by the preferably present holding-open spring 25, the friction surface 14 of the wraparound part 31 is then spaced apart (at least in sections) from the friction surface 15 of the inner braking part 10 up to a limit value of the speed of the component 1 or a limit value of the rotational speed of the catch arm 5, and the first braking device is substantially ineffective (i.e. the braking action thereof is at any rate smaller than the braking action of the second braking device). Only when this limit value is exceeded does the first braking device become effective.

At a high speed, with which the component 1 strikes against the catch arm 5, without the overload spring 32 a suddenly occurring, high braking force of the device would occur, as a result of which undesirably high loadings and an undesirably severe braking of the component 1 would be the consequence. The peak of the braking force is cushioned by the overload spring 32 by the catch arm 5 being able to rotate in relation to the wraparound part 31, with the overload spring 32 being deformed.

In the exemplary embodiment illustrated, as already mentioned, there is furthermore a retracting spring 27, which could also be omitted if only the damping function is desired. The retracting spring 27 runs between the catch arm 5 and the unit formed by the housing part 28 and the inner braking part 10. In particular, latching arms 43 between which the inner end (i.e. located closer to the axis 6) of the retracting spring 27 can be latched are arranged on the housing part 28.

During the pivoting of the catch arm 5 from the main position thereof in the direction of the waiting position thereof, the retracting spring 27 is first of all tensioned, cf. FIG. 11 and FIG. 10. Shortly before the waiting position is reached, a dead center is crossed (this is the position illustrated in FIG. 10), and, as a consequence, the retracting spring is again relaxed a little (by preferably less than one fifth of the preceding compression stroke) until the waiting position illustrated in FIG. 9 is reached.

When the driver 2 runs up against the catch arm 5 while the pull-out furniture part is being pushed in, said two parts couple to each other and the driver 2 pivots the catch arm 5 over the dead center thereof. As a result, the pull-out furniture part is refracted by the catch arm 5 by means of the force of the refracting spring 27 until the main position of the catch arm illustrated in FIG. 11 is reached. The further pivoting is limited in the waiting position and in the main position by corresponding stops (in the main position, this can also be achieved by a stop for the pushing-in movement of the pull-out furniture part).

The pull-out furniture part is refracted here counter to the braking force exerted by the device. Since the retraction speed, optionally after damping of the initially more rapid speed on running up against the catch arm, is relatively low, essentially only the relatively low braking force of the second braking device has to be overcome here. The force of the retracting spring 27 can therefore be configured to be relatively low, which makes it easier to pull out the pull-out furniture part.

If the retracting spring 27 can be connected to the housing part 28 at different distances from the axis 6, by, for example, a plurality of latching arms 43 being provided, the strength of the retracting force can be changed by different pretensions of the retracting spring 27. Connecting possibilities to different points of the catch arm 5 can also be provided, or a continuous change in the distance from the axis, for example by means of an eccentric element, can be provided.

In the exemplary embodiment, a curved leaf spring is provided as the retracting spring. Retracting springs designed in a different manner can also be provided. As an example, FIG. 23 illustrates a variant embodiment with a leg spring. It could also be possible, for example, to provide a curved leaf spring which optionally has a greater width in a central region than in the end-side connecting regions and can also run, for example, upward or downward in a curved manner.

The entry of one of the projections 4 of the retracting lever 5 into the associated slotted guide track 3 of the driver 2 when the component 1 is displaced in the direction of movement 44 is illustrated in FIG. 15. The slotted guide track 3 running in a curved manner (the two slotted guide tracks 3 have an identical profile) has an entry section 3a, at the beginning of which the projection 4 moves from outside the slotted guide track 3 into the slotted guide track 3. The slotted guide track 3 guides the projection 4 via the entry section 3a in a direction 69 which encloses an angle α of less than 30° with the pull-out direction 68, which is directed counter to the direction of movement 44. The angle α increases continuously here from the start of the entry section 3a, in which said angle α is preferably less than 20°, particularly preferably less than 15°, as far as the end of the entry section 3a. The end of the entry section 3a and the start of a continuation section 3b of the slotted guide track 3 are therefore located wherever said angle α reaches the value of 30°. This angle α increases further over the continuation section 3b until said angle is in any case more than 45°, and between 80° and 90° in the exemplary embodiment shown. FIG. 15 shows the angle α for a position of the projection 4 within the continuation section 3b, in which the angle α is somewhat more than 45°.

In the exemplary embodiment shown, the angle α, as soon as the latter has reached its maximum value, is constant as far as the end of the continuation section 3b. In other exemplary embodiments, a bent design of the slotted guide 3 toward that end of the continuation section 3b which is remote from the entry section 3a is also possible.

The projection 4 is therefore guided by the slotted guide track 3 at least over a part of the entry section of the slotted guide track 3, which part adjoins the beginning of the entry section 3a, at an angle of less than 20°, preferably less than 15°, with respect to the pull-out direction 68. At least over a part of the continuation section 3b, the projection 4 is guided by the slotted guide track 3 preferably in a direction which encloses an angle of more than 70°, preferably more than 80°, with the pull-out direction 68.

FIG. 15 illustrates three positions of the projection 4 on entry into the slotted guide track 3 by dashed lines. The first position shows precisely the first running of the projection 4 up against the side wall 45 of the slotted guide track 3, by means of which the retracting lever 5 is pivoted over the dead center (said side wall 45 is then, in the continuation section 3b, that side wall of the slotted guide track 3 which is located at the rear with respect to the direction of movement 44 of the component 1). The angle α is less than 20°, preferably less than 10°, here. In the second position, the projection 4 is already in the continuation section 3b, wherein the angle α here is scarcely larger than 45°. In the third position illustrated, the projection 4 is located in the continuation section 3b at the location which said projection takes up in the fully pushed-in state of the pull-out furniture part, the angle α here being between 80° and 90° in the exemplary embodiment. The side wall 45 runs in each case in the direction in which the projection 4 is guided by the slotted guide track 3, and therefore the angle which the side wall 45 encloses in each case with the pull-out direction 68 corresponds to the angle α between the direction of the guidance of the projection 4 and the pull-out direction 68.

Thought the use of the described curved profile of the at least one slotted guide track 3, the force required for actuating the catch arm 5 when the component 1 is pushed in can be influenced. In particular, a type of transmission ratio arises through the profile of the entry section 3a. As a result, when the component 1 runs up against the catch arm 5 at a certain speed, at the beginning of the running-up operation, when the projection 4 is located in the region of the entry section 3a of the slotted guide track 3, the damping force acting on the component 1 is reduced. Furthermore, the dead center of the retracting spring 27 (if such a spring is present) can thereby be overcome by a smaller force which can be applied by the component 1.

When the catch arm 5 rotates back in the direction of rotation opposed to the arrow 26, the damper sleeve 18 is rotated by the catch arm 5 via the holding-open spring 25 such that the force which is to be overcome here can be exerted. This force is comparatively small, since the first braking device is not effective in this direction of rotation.

If, however, the application of such a force is not desired, a freewheel can be provided between a part connected to the wraparound part 31, optionally via the holding-open spring 25 and/or the overload spring 32, and the catch arm 5, said freewheel being closed in the direction of rotation 26 corresponding to the arrow and opening in the opposed direction of rotation. Such freewheels are known, also in conjunction with dampers. FIG. 15 furthermore discloses a self-sealing section 3c of the slotted guide track 3. By means of said self-sealing section, the respective projection 4 can enter the continuation section 3b when the driver 2 is intended to run up against the retracting lever 5, which is in the main position thereof, as the component 1 is being pushed in. The self-sealing section runs at least substantially (i.e. there is a deviation of less than 15°) parallel to the pull-out direction 68. The self-sealing sections 3c are widened toward the open ends thereof by entry slopes. So that the projections 4 can enter through the self-sealing sections 3c, but the projections 4 cannot run out of the continuation sections 3b through the self-sealing sections 3c, the elasticities of the components can be utilized (such that the projection 4, as in FIG. 15, is offset with respect to the self-sealing section 3c when the component 1 has entered the latter). Provision could also be made, for example, for steps to be traveled over when the projections 4 enter through the self-sealing sections 3c, with the side members 2a, 2b containing the slotted guide tracks 3 being pushed apart. In addition or instead, additional spring-elastic latching elements which are arranged on the driver 2 could be provided.

In a modified embodiment in relation to the embodiment illustrated, the catch arm 5 could also be mounted pivotably on the damper sleeve 18, specifically about an axis of rotation parallel to the axis 6. The wraparound part 31 or the overload spring 32 connected to the wraparound part 31 could then be connected to the catch arm radially outside said pivot axis. By means of a restoring spring, the catch arm 5 could be acted upon into a starting position with respect to the pivot axis thereof in relation to the damper sleeve 18. During the damping of the movement of the component 1, when the catch arm 5 is pivoted to a greater or lesser extent about the pivot axis counter to the force of the restoring spring acting thereupon, since the rotation of the pivot axis about the axis 6 is braked by the braking force of the second braking device, the wraparound part 31 is tightened to a greater or lesser extent and pressed onto the secured friction surface 15.

Other linearly displaceably mounted components then pull-out furniture parts can also be damped by the braking device. Furthermore, a damping of rotatably mounted components is also possible, wherein, depending on the application, a retracting spring 27 can be provided or else can be omitted. The component to be damped can be connected to the device optionally in a different manner than via a radially projecting catch arm (i.e. catch lever) which is mounted rotatably about the axis 6, for example via a pinion which is mounted rotatably about the axis 6 and is connected to the wraparound part 31, optionally via an overload spring 32.

The wraparound part 31 can also be formed by a wire, in particular spring wire, or a cord, instead of by a band. The wraparound angle of the wire or of the cord is advantageously between 90° and 530°, preferably between 180° and 500°, wherein a wraparound angle of between 250° and 330° is particularly preferred.

A kinematic reversal is also possible, wherein the inner braking part 10, or the unit comprising the inner braking part 10 and optionally also the housing part 28, is driven by the component 1 to be damped, and the wraparound part 31 is secured at its front connecting point 33 and the damper sleeve 18 is secured via said wraparound part. The previously described, driven friction surface 14 illustrated in the drawing then becomes the secured friction surface, and vice versa. The previously described, driven damper surface 21 illustrated in the drawing then becomes the secured damper surface, and vice versa. The wraparound part could then also be secured by a different part than by an arm protruding from the axis 6 (corresponding to the catch arm 5).

Figure 16:
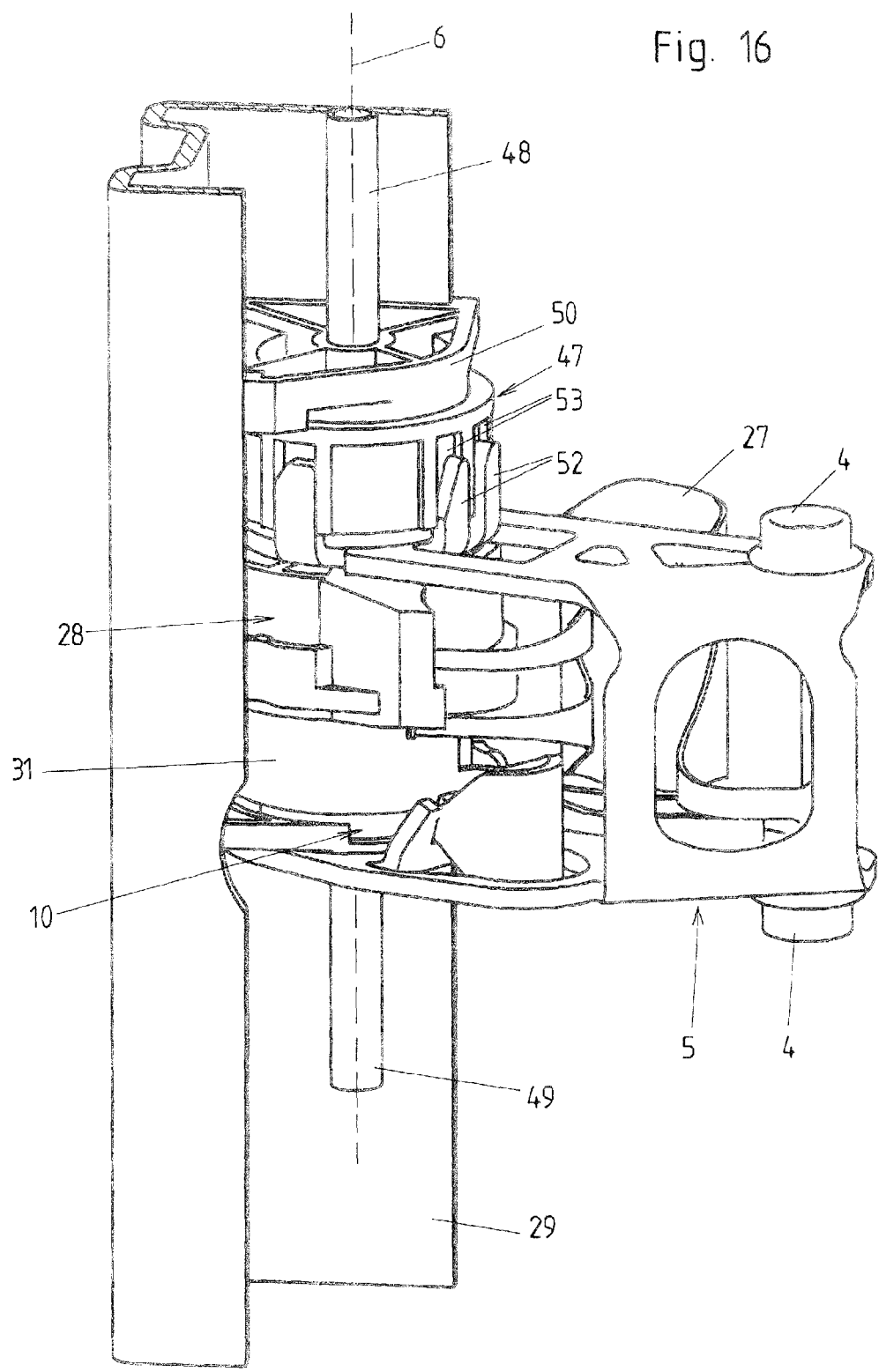
FIG. 16 shows a slightly modified variant embodiment of the device with additional elements for forming a pull-out locking device.
Figure 18:
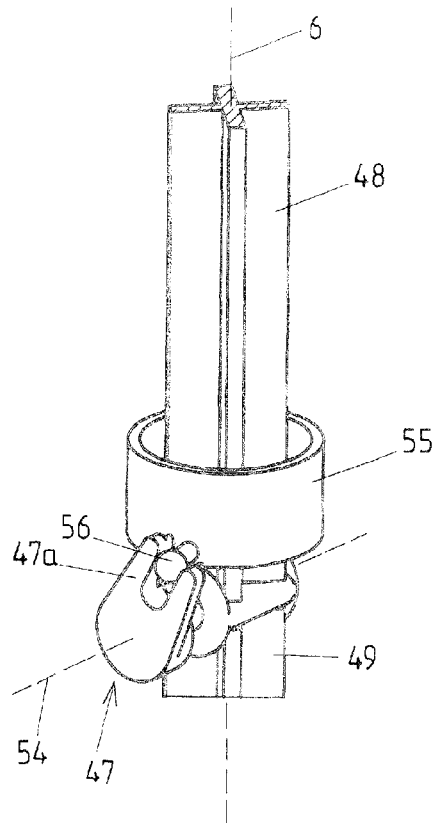
FIGS. 18 and 19 show schematic illustrations of an alternative variant embodiment for the actuation of the blocking rods.
Figure 19:
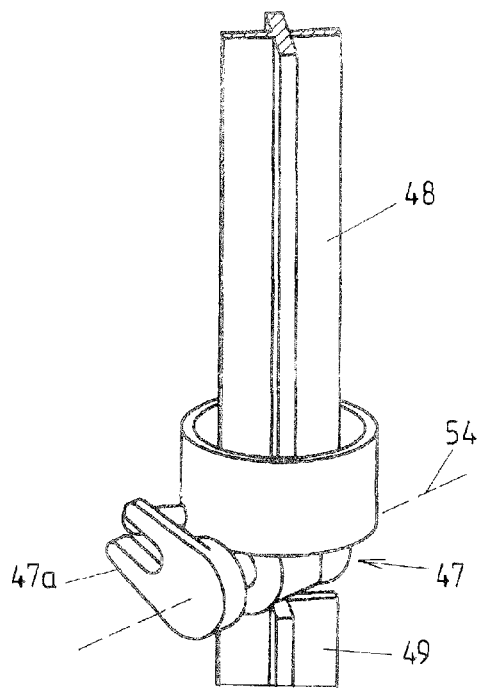
Figure 20:
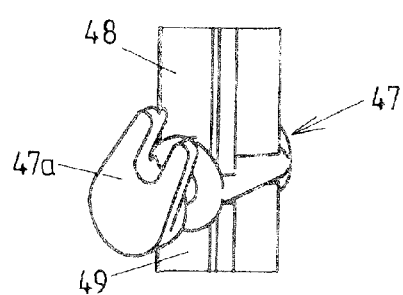
FIGS. 20 and 21 show illustrations corresponding to FIGS. 18 and 19, but without the actuating sleeve.
Figure 21:
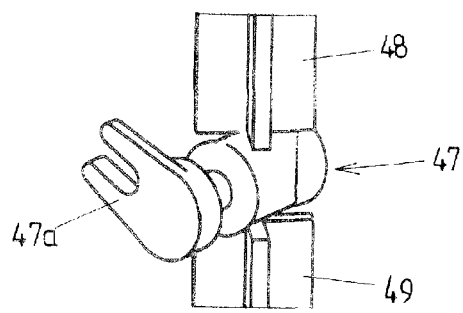
Figure 22:
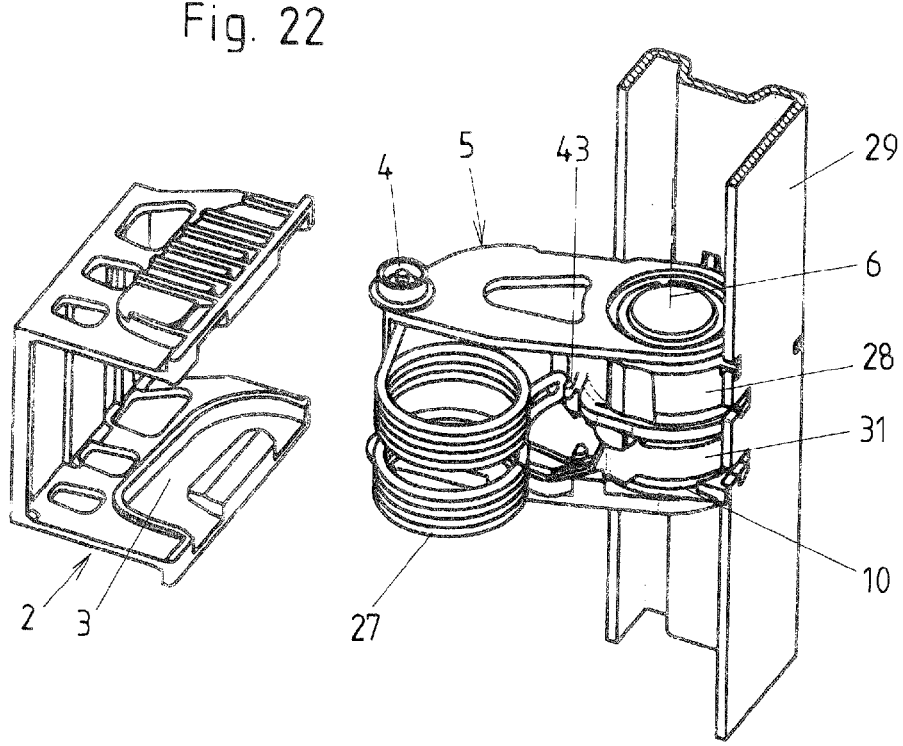
FIG. 22 shows a perspective view corresponding to FIG. 5 of a further modification of the second embodiment.

FIGS. 16, 17 and 17a disclose a modification of the second embodiment of the invention, the modification constituting the integration of a pull-out blocking device into a device according to the invention. Apart from the differences described below, the device according to the invention is designed in the same manner as the embodiment of the device according to the invention that is described with reference to FIGS. 4 to 15.

Pull-out blocking devices serve to the effect that, of a plurality of pull-out furniture parts which are coupled to one another via the pull-out blocking device, only one can be pulled out at the same time. Only after this pull-out furniture part is pushed in can another be pulled out. Furthermore, if desired, central locking can be provided via such a pull-out blocking device.

In the design of the pull-out blocking device that is shown in the exemplary embodiment, blocking rods which have only a limited clearance (i.e. a limited amount of play) for the displacement thereof run between actuating parts, which are assigned to the individual pull-out furniture parts. If one of the pull-out furniture parts is extended, the two blocking rods interacting with the actuating part (if a central pull-out furniture part is involved, blocking rods are arranged on both sides of the actuating part thereof) are moved apart from each other by the actuating part. As a result, the available clearance is used up, and therefore the blocking rods interacting with another of the actuating parts can no longer move apart from each other and therefore a further pull-out furniture part can no longer be pulled out. The actuating part of an end-side pull-out furniture part can also interact only with one blocking rod which displaces said actuating part as said pull-out furniture part is being pulled out. The basic design of the pull-out blocking device corresponds in this respect to the prior art, for example in a manner corresponding to the documents mentioned at the beginning regarding pull-out blocking devices.

The unit formed by the inner braking part 10 and housing part 28 has a cavity 46 which extends in the direction of the axis 6 and passes completely through the unit. Parts of the pull-out blocking device can be accommodated by said cavity.

By means of a part which is rotated about the axis 6 as the pull-out furniture part is being pulled out and pushed in, by means of the catch arm 5 in the exemplary embodiment shown, an actuating part 47 assigned to said pull-out furniture part is adjusted. If further pull-out furniture parts are arranged above and below the pull-out furniture part, the actuating part 47 displaces an upper blocking rod 48 upward and/or a lower blocking rod 49 downward. If the lowermost pull-out furniture part is involved, only one upper blocking rod 48 could be displaced upward. If the uppermost pull-out furniture part is involved, only a lower blocking rod 49 could be displaced downward.

In this exemplary embodiment, the actuating part 47 is designed as a cam disk which is rotatable about the axis 6. A cam follower part 50, 51 is respectively fitted on the blocking rods 48, 49, which are actuated by the actuating part 47, wherein the cam follower parts 50, 51 are secured against rotation about the axis 6.

When the actuating part 47 is rotated about the axis 6 in a first direction of rotation, the two cam follower parts 50, 51 are pushed apart (by displacement of at least one of the blocking rods parallel to the axis 6), and said cam follower parts can approach each other again on rotation of said actuating part in the opposed direction of rotation (corresponding to the arrow 26).

The actuating part 47 can be displaced by a limited displacement distance in relation to the catch arm 5 in the direction of the axis 6, wherein said actuating part nevertheless continues to be connected to the catch arm 5 for rotation therewith. For this purpose, in the exemplary embodiment, the catch arm 5 has claws 52 which extend in the direction of the axis 6 and engage in recesses 53 of the actuating part 47.

A displacement of at least one of the blocking rods 48, 49 by an actuating part assigned to one of the pull-out furniture parts, without the connection of the rest of the actuating parts to the respectively associated catch arm for rotation therewith being released, is thereby made possible.

The cam follower part 50 has an axial extension 50a with latching tongues 50b. The cam follower part 51 has an axial extension 51a with latching tongues 51b.

The cam follower part 51 can be plugged by the extension 51a into the cavity 46, and the cam follower part 50 can be plugged by the extension 50a through a central opening in the actuating part 47 into a central opening in the cam follower part 51. In order to facilitate assembly, the parts are held together by the latching tongues 50b, 51b before the device is fitted together, with the required movement margins being maintained after the assembly.

The carry-along connection between the wraparound part 31 and the damping sleeve 18 is indicated here by an axial projection 35' of the wraparound part 31 and a depression 36', receiving said projection, in the damper sleeve 18, cf. in particular FIG. 17a.

The blocking rods 48, 49 could also be actuated in another manner. One such further possible design is illustrated in FIGS. 18 to 21. The actuating part 47 here is designed in the form of a cam part which is pivotable about a pivot axis 54 lying at right angles to the axis 6. The actuating part 47 interacts here with the end of the at least one adjacent blocking rod 48, 49, or with a part connected to said blocking rod, in order to displace the blocking rod 48, 49, during the pivoting thereof about the pivot axis 54, in the respective direction parallel to the axis 6.

The actuating part 47 has an actuating arm 47a which protrudes radially from the pivot axis 54 and is connected to a sleeve 55 which is rotatable about the axis 6. When the sleeve 55 is rotated about the axis 6, the actuating part 47 is pivoted about the pivot axis 45. Between the sleeve 55 and the actuating arm 47a, a limited displacement in the direction of the axis 6 is possible, for example by the end of the actuating arm 47a being designed in the shape of a fork in which a pin 56 fitted on the sleeve 55 engages.

The sleeve 55 can be connected to the catch arm 5 or to another part which rotates about the axis 6 when the catch arm is rotated about the axis 6, for example to the damper sleeve 18. An integral design with the catch arm 5 or with the part rotated about the axis 6, for example with the damper sleeve 18, is also possible.

The pull-out furniture parts which are coupled to one another by the pull-out blocking device could also be arranged next to one another instead of vertically one above another. The blocking rods 48, 49 and the axis 6 would then be arranged horizontally. The terms "at the top" and "at the bottom" used in the preceding description would then have to be replaced by "on the left" and "on the right". Arrangements of the blocking rods 48, 49 and the axis 6 in a manner inclined in relation to the horizontal are basically also conceivable and possible.

Figure 23A:
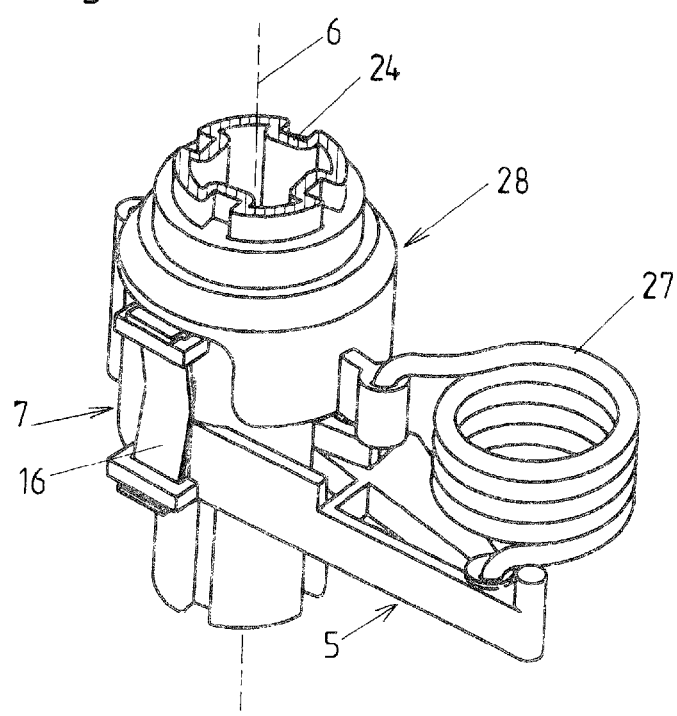
FIGS. 23a and 23b show a modified embodiment to the first embodiment described with reference to FIGS. 1 to 3, in a perspective view and in an exploded illustration.
Figure 23B:
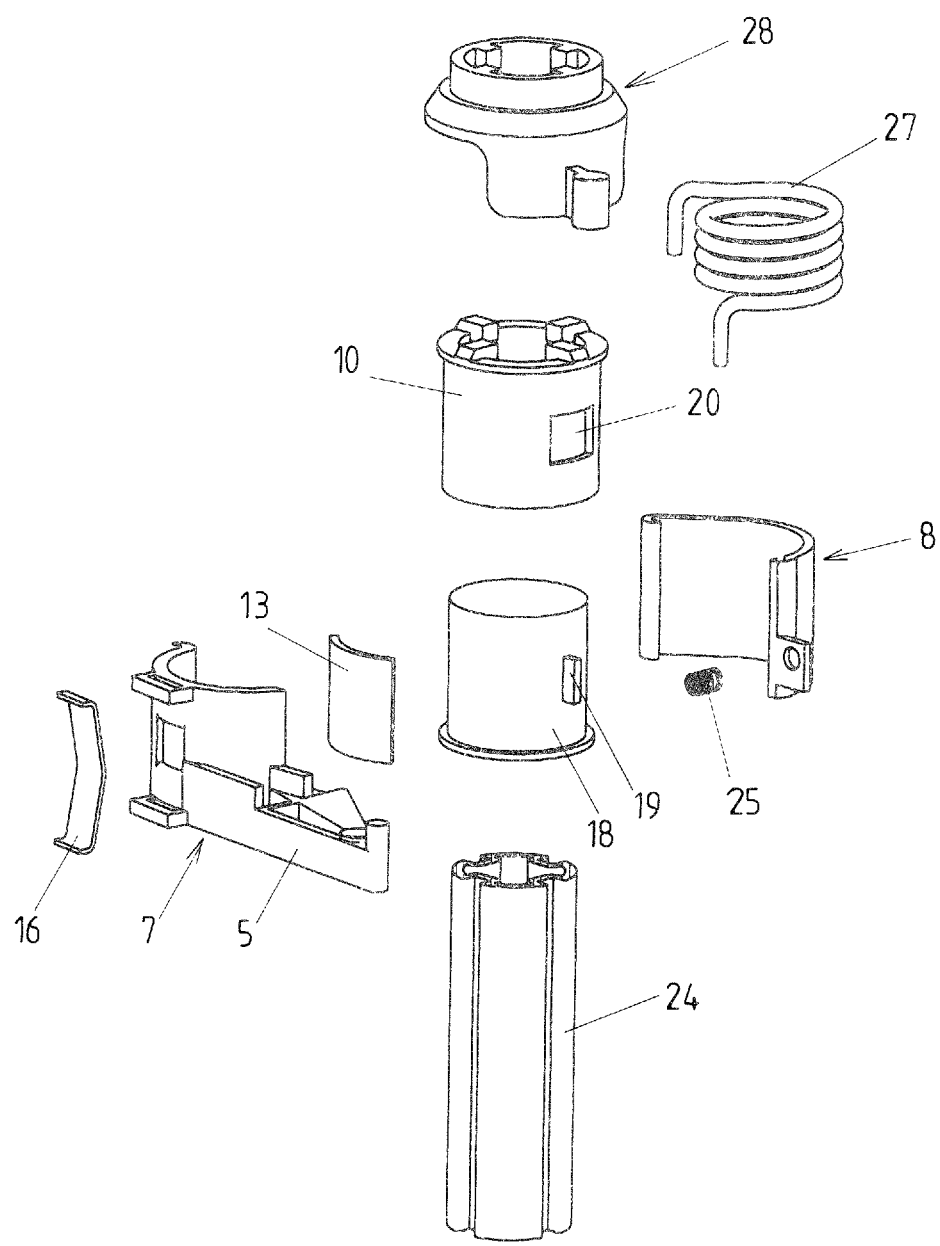
Figure 24:
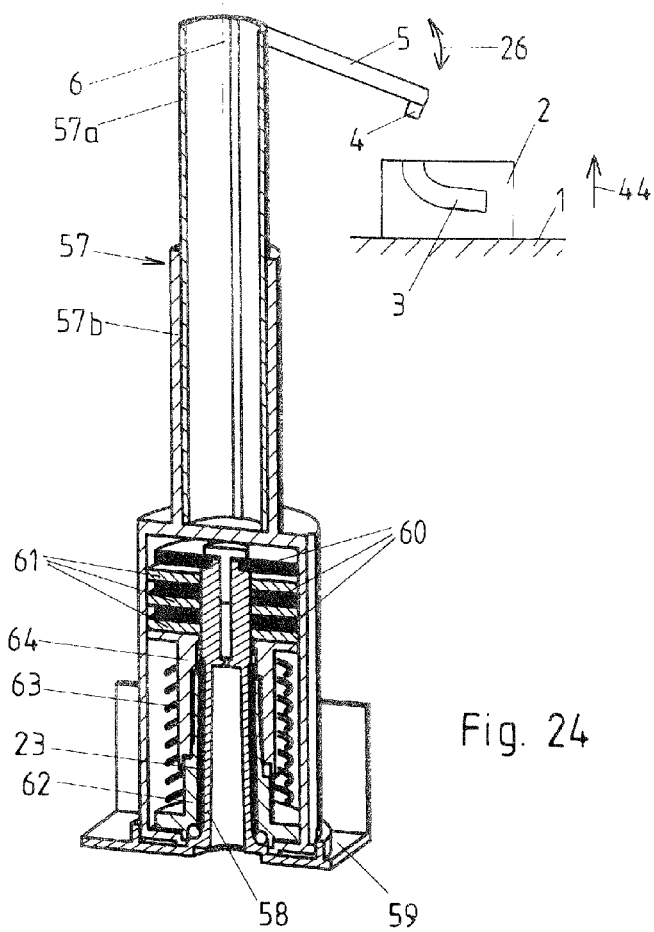
FIG. 24 shows a perspective view of a third embodiment of the invention, the device cut open in the longitudinal center section.
Figure 25:
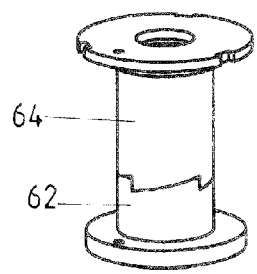
FIGS. 25 and 26 show two different positions of the control surfaces.
Figure 26:
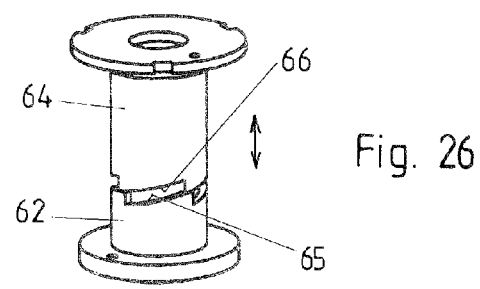
Figure 27:
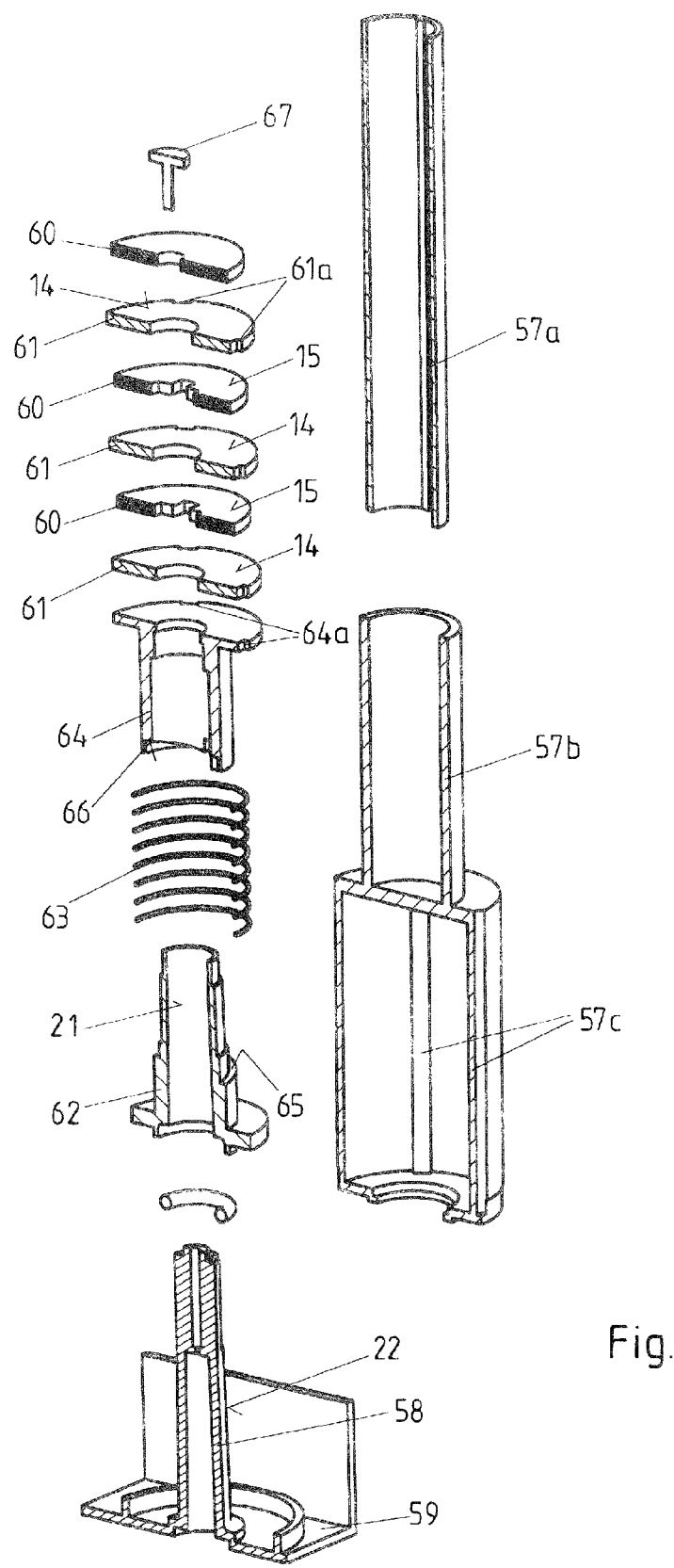
FIG. 27 shows the device of FIG. 24 in the exploded state of the parts.

FIGS. 23a and 23b show another modification of the first embodiment described with reference to FIGS. 1 to 3, in order to equip the first embodiment with a retracting spring 27. The latter is designed, for example, as illustrated, in the form of a leg spring (a design in a different form, for example in the form of a leaf spring, as illustrated in the second embodiment, could also be provided) and acts firstly on the catch arm 5 and secondly on a housing part 28 which is held in a rotationally fixed manner with regard to rotation about the axis 6, for example by a connection to the shaft 24 for rotation therewith. A connection to the inner braking part 10 for rotation therewith could also be provided.

The function of the retracting spring 27 is described completely analogously as in conjunction with the second embodiment. When the catch arm 5 is pivoted from the main position thereof into the waiting position, the retracting spring 27 is tensioned, wherein the latter is moved over a dead center before reaching the waiting position and therefore holds the catch arm 5, which has been pivoted into the waiting position, in said waiting position.

A third embodiment of the invention is illustrated in FIGS. 24 to 27. The rotational movement introduced into a shaft 57 which is rotatable about an axis 6 is to be damped here. For this purpose, for example, a catch arm 5 which is fastened to a shaft part 57a and protrudes from the axis 6 can interact with a driver 2 which has a slotted guide track 3 into which a projection 4 of the catch arm 5 enters. The driver 2 is fitted on a component 1, which is merely indicated schematically, wherein the shaft 57 is rotated by the component 1.

For example, the shaft 57 could also be rotated by a pivotable component, for example a flap, wherein the component is connected, for example, rigidly to the shaft 57 and is thereby mounted pivotably about the axis 6. A separate pivotable mounting of the component is also possible.

The shaft 57 furthermore comprises a shaft part 57b, which is connected rigidly to the shaft part 57a and is designed as a hollow shaft, and has a receiving space for receiving further parts of the device.

A secured damper part 58 which extends in the axial direction of the shaft 57 and is rigidly connected to a stationary basic part 59 projects into the receiving space of the shaft part 57b. Secured friction parts 60 which are of disk-shaped design are connected to a section of the secured damper part 58 for rotation therewith. Driven friction parts 61 which are connected to the shaft part 57b for rotation therewith interact with the secured friction parts. For the connection to the shaft part 57b for rotation therewith, the shaft part 57b has inwardly projecting webs 57c which engage in depressions 61a on the outer edge of the disk-shaped driven friction parts 61.

The secured and driven friction parts 60, 61 are alternately stacked in the manner of a multi-disk clutch. The mutually facing surfaces form secured and driven friction surfaces 15, 14.

The first, mechanically acting braking device therefore comprises the secured and driven friction parts 60, 61.

The secured friction parts 60 located between driven friction parts 61 are displaceable in the direction of the axis 6 in relation to the secured damper part 58. The driven friction parts 61 are displaceable in the direction of the axis 6 in relation to the shaft part 57b.

Furthermore, a driven damper part 62 is arranged in the receiving space of the shaft part 57b. This damper part is driven via the shaft 57 and the coupling part 64 by the movement of the component 1 to be damped and, for this purpose, is connected via the coupling spring 63 to the coupling part 64 which, for its part, is connected to the shaft part 57b for rotation therewith. For connection to the shaft part 57b for rotation therewith, the coupling part 64 has depressions 64a, in which the webs 57c of the shaft part 57b engage, on the outer edge of an annular collar. The coupling part 64 is displaceable here in the direction of the axis 6 in relation to the shaft part 57b.

A section of the outer surface of the secured damper part 58 forms a secured damper surface 22. An inner surface of the driven damper part 62 forms a driven damper surface 21. A viscous damping medium 23 is located in the gap between the driven damper surface 21 and the secured damper surface 22. The second braking device therefore comprises the secured damper part 58, the driven damper part 62 and the damping medium 23 arranged therebetween.

If a braking force were not exerted by the second braking device, the driven damper part 62 would be carried along by the coupling part 64 via the coupling spring 63 without a change in the angular position between the coupling part 64 and the driven damper part 62. However, the higher the rotational speed of the shaft 57, the greater the braking force brought about by the second braking device. This leads to a speed-dependent angular offset between the rotational position of the driven damper part 62 and the coupling part 64, and therefore also in relation to the angular position of the shaft 57, counter to the restoring force of the coupling spring 63.

The driven damper part 62 and the coupling part 64 have interacting control surfaces 65, 66. The control surfaces 65, 66 have a profile which runs about the axis 6 and rises in relation to the axis 6 (i.e. said control surfaces are of helicoidal design).

The driven damper part 62 is supported against an axial displacement directed away from the friction parts 60, 61. With an increasing angular offset between the driven damper part 62 and the coupling part 64, the coupling part 64 is displaced by the interacting control surfaces in the axial direction against the friction parts 60, 61, wherein the friction part furthest away from the coupling part 64 (a secured friction part 60 here) is supported against an axial displacement in this direction, for example by means of the head of a holding bolt 67 connected to the secured damper part 58.

With increasing speed of the shaft 57, the driven and secured friction surfaces 14, 15 are therefore increasingly pressed against each other, as a result of which the braking force of the first braking device rises with increasing speed of the shaft 57.

The first braking device could also be designed differently than in the manner of a multi-disk brake. For example, a secured friction part 60 which has a conical secured friction surface 15 running about the axis 6 and interacts with a conical driven friction surface 14 of the driven friction part 61 could be provided.

The driven damper part 62 could also be connected via the coupling spring 63 to the shaft part 57b, to one of the driven friction parts 61 or to another part driven by the shaft 57.

In order to cushion load peaks, an overload spring could be arranged in the transmission path of the force which is transmitted from the component 1 to be damped to the device and drives the device. For example, the shaft parts 57a, 57b could be rotatable with respect to each other counter to the restoring force of said overload spring. Another possibility would be, for example, to connect the secured damper part 58 to the basic part 59 via an overload spring such that, when a load peak occurs, the secured damper part 58 can be rotated in relation to the basic part 59 counter to the restoring force of the overload spring. The secured damper part 58 is then secured by the overload spring against a continuous revolution about the axis 6 in such a manner that, despite a certain rotation of the secured damper part 58 when a load peak occurs in the course of the damping of the movement of the component 1, a rotation of the driven damper part 62 in relation to the secured damper part 58 nevertheless occurs. At least in the stationary state, if a constant equilibrium has arisen, the angular position of the secured damper part 58 remains unchanged.

The design of the device could also be reversed to the effect that the shaft 57 is of stationary design and, in order to damp the movement of the component 1, the basic part 59 (which may be of modified design in this case) is rotated by the component 1 about the axis 6. The at least one driven friction part then becomes the secured friction part and the at least one secured friction part then becomes the driven friction part. Furthermore, the secured damper part then becomes the driven damper part and the driven damper part becomes the secured damper part. The secured damper part is then secured against rotation about the axis 6 by the coupling spring 63, with a certain rotation of the secured damper part being possible, as a result of which the control surfaces 65, 66 are actuated. At least in the stationary state of the device, if there is a constant equilibrium (in the case of a constant drive of the device), the angular position of the secured damper part remains unchanged.

In the previously described exemplary embodiments, the axis of the first braking device corresponds in each case to the axis of the second braking device, as is preferred. However, designs are also conceivable and possible in which said axes, for example, lie parallel to each other, but are at a distance from each other. Angular alignments between said axes are in principle also possible. Corresponding transmission members, for example gearwheels, would then have to be provided between the first and the second braking device.

In the described embodiments, a first, mechanically acting braking device with two parts which are rotatable in relation to each other about an axis (i.e. a first rotational damper) and a second braking device which is coupled to said first braking device and the braking force of which is brought about by a viscous damping medium arranged in at least one gap between two parts which are rotatable in relation to each other about an axis (i.e. a second rotational damper) are present in each case. In this connection, modified designs of such a device are possible in a different manner.

KEY FOR THE REFERENCE NUMBERS

1 Component
2 Driver
3 Slotted guide track
3a Entry section
3b Continuation section
3c Self-sealing section
4 Projection
5 Catch arm
6 Axis
7 Front jaw part 8 Rear jaw part
9 Pivot axis
10 Inner braking part
11 End
12 End
13 Brake lining
14 Driven friction surface
15 Secured friction surface
16 Press-on spring
17 Opening
18 Damper sleeve
19 Driver lug
20 Window recess
21 Driven damper surface
22 Secured damper surface
23 Damping medium
24 Shaft
25 Holding-open spring
26 Arrow
27 Retracting spring
28 Housing part
29 Rail
30 Furniture body
31 Wraparound part
32 Overload spring
33 Front connecting point
34 Rear connecting point
35 Slot
35' Projection
36 Projection
36' Depression
37 Wall
38 Wall
39 Wall
40 Wall
41 Sealing ring
42 Sealing ring
43 Latching arm
44 Direction of movement
45 Side wall
46 Cavity
47 Actuating part
47a Actuating arm
48 Blocking rod
49 Blocking rod
50 Cam follower part
50a Extension
50b Latching tongue
51 Cam follower part
51a Extension
51b Latching tongue
52 Claw
53 Recess
54 Pivoting axis
55 Sleeve
56 Pin
57 Shaft
57a Shaft part
57b Shaft part
57c Web
58 Secured damper part
59 Basic part
60 Secured friction part
61 Driven friction part
61a Depression
62 Driven damper part
63 Coupling spring
64 Coupling part
64a Depression
65 Control surface
66 Control surface
67 Holding bolt
68 Pull-out direction
69 Direction

The invention claimed is:

1. A device for damping movement of a movably mounted component, comprising a first, mechanically acting braking device which includes a flexible outer braking part having a front connecting point and a rear connecting point and at least one first friction surface and an inner braking part having at least one second friction surface, the outer braking part surrounding the inner braking part at least over a part of a circumference of the inner braking part amounting to more than 90°, the at least one first friction surface and the at least one second friction surface bearing against each other and forming at least one friction pairing, in which, in order to generate a braking force, the outer braking part is driven by the movement of the movably mounted component and is rotatable about an axis of the first braking device in relation to the inner braking part which is secured against rotation about the axis of the first braking device, or the inner braking part is driven by the movement of the movably mounted component and is rotatable about an axis of the first braking device in relation to the outer braking part, of which the front connecting point is secured against a rotation about the axis of the first braking device, and
a second braking device which includes at least one first damper surface which is driven by the movement of the movably mounted component and rotatable about an axis of the second braking device and at least one second damper surface, the at least one first damper surface and the at least one second damper surface enclose at least one gap containing a viscous damping medium which brings about a braking force of the second braking device when the at least one first damper surface is rotated in relation to the at least one second damper surface of the second braking device,
wherein the rear connecting point of the outer braking part of the first braking device is connected to a damper sleeve which has at least one of the damper surfaces of the second braking device, and, in the case that the outer braking part is driven and the inner braking part is secured against rotation about the axis of the first braking device, a movement of the component to be damped is transmitted to the front connecting point of the outer braking part, or, in the case that the inner braking part is driven and the front connecting point of the outer braking part is secured against rotation about the axis of the first braking device, the movement of the component to be damped is transmitted to the inner braking part, whereby the second braking device is coupled to the first braking device so that the first and the second friction surfaces of the friction pairing, or of at least one of the friction pairings, of the first braking device are pressed against each other as a function of a braking force exerted by the second braking device.

2. The device as claimed in claim 1, wherein the axis of the first braking device corresponds to the axis of the second braking device.

3. The device as claimed in claim 1, wherein the outer braking part extends from the front connecting point to the rear connecting point in a first direction of rotation about the axis of the first braking device.

4. The device as claimed in claim 3, wherein at least in a state of the device, in which said device damps the movement of the component, a holding-open spring acts upon the rear connecting point of the outer braking part in relation to the front connecting point of the outer braking part, in a second direction of rotation, which is opposed to the first direction of rotation, about the axis of the first braking device.

5. The device as claimed in claim 1, wherein the inner braking part or a part which is connected thereto has at least one of the damper surfaces of the second braking device which, with the at least one damper surface of the damper sleeve, forms the gap, or at least one of the gaps, containing the viscous damping medium.

6. The device as claimed in claim 1, wherein the device has an overload spring which is arranged in a transmission path of force which is transmitted from the component to be damped to the device and drives the device.

7. The device as claimed in claim 1, wherein the component to be damped is a pull-out furniture part which, on being pushed in, couples to a catch arm of the device, said catch arm is pivotable about the axis of the first braking device from a waiting position into a main position and, in the process, the at least one driven friction surface of the first braking device rotates about the axis of the first braking device.

8. The device as claimed in claim 7, wherein the overload spring is arranged in the transmission path between the catch arm and the at least one driven friction surface of the first braking device.

9. The device as claimed in claim 7, wherein the catch arm is acted upon by a retracting spring, the retracting spring is tensioned to a greater extent in the waiting position of the catch arm than in the main position of the catch arm and, when the catch arm is adjusted from the main position into the waiting position, a dead center of the retracting spring is overcome.

10. The device as claimed in claim 1, wherein a driver, which has at least one slotted guide track, is arranged on the component to be damped or on a part of the device that is pivotable about the axis by the component to be damped, and at least one projection is arranged on the other of said component to be damped or on a part of the device that is pivotable about the axis by the component to be damped, said projection entering the at least one slotted guide track during the damping of the component, the slotted guide track has an entry section, via which the projection is guided in a direction which encloses an angle ($\alpha$) of less than 45° with a direction which is opposed to a direction of movement of the component, and a continuation section which adjoins the entry section and via which the projection is guided in the direction which encloses an angle of more than 45° with the direction which is opposed to the direction of movement of the component.

11. The device as claimed in claim 10, wherein at least over a part of the entry section that adjoins a beginning of the entry section remote from the continuation section, the projection is guided in a direction which encloses an angle of less than 30° with the direction which is opposed to the direction of movement of the component.

* * * * *